(12) United States Patent
Chen et al.

(10) Patent No.: US 11,146,376 B2
(45) Date of Patent: Oct. 12, 2021

(54) SYSTEM TYPE DEPENDENT MASTER INFORMATION BLOCK (MIB)

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/133,776

(22) Filed: Apr. 20, 2016

(65) Prior Publication Data

US 2016/0315752 A1    Oct. 27, 2016

Related U.S. Application Data

(60) Provisional application No. 62/151,379, filed on Apr. 22, 2015.

(51) Int. Cl.
*H04L 5/14* (2006.01)
*H04W 56/00* (2009.01)
(Continued)

(52) U.S. Cl.
CPC ............... *H04L 5/14* (2013.01); *H04L 5/005* (2013.01); *H04W 48/10* (2013.01); *H04W 48/12* (2013.01);
(Continued)

(58) Field of Classification Search
CPC .......... H04L 5/14; H04L 5/005; H04W 48/10; H04W 72/0446; H04W 56/00
See application file for complete search history.

(56) References Cited

U.S. PATENT DOCUMENTS

| 9,860,030 B2 | 1/2018 | Papasakellariou |
| 2007/0041347 A1 | 2/2007 | Beale et al. |

(Continued)

FOREIGN PATENT DOCUMENTS

| CN | 101400130 A | 4/2009 |
| CN | 101505502 A | 8/2009 |

(Continued)

OTHER PUBLICATIONS

ISA/EP, International Search Report and Written Opinion of the International Searching Authority, Int'l Appl. No. PCT/US2016/028567, dated Jul. 7, 2016, European Patent Office, Rijswijk, NL, 12 pgs.

(Continued)

*Primary Examiner* — Walli Z Butt
*Assistant Examiner* — Thad N Defauw
(74) *Attorney, Agent, or Firm* — Qualcomm Incorporated

(57) ABSTRACT

Methods, systems, and devices for wireless communication are described. A user equipment (UE) may determine a duplexing configuration (e.g., frequency division duplexing (FDD) or time division duplexing (TDD)) of a carrier based on one or more synchronization signals. The UE may then receive a master information block (MIB) on the carrier, and may interpret one or more fields of the MIB based on the duplexing configuration of the carrier. The configuration dependent fields may include a special subframe field, a system information location field, or both. In some cases, such as in a TDD configuration, the UE may postulate a special subframe configuration of the carrier in order to receive the MIB, and may update the postulated special subframe configuration after receiving the MIB.

36 Claims, 15 Drawing Sheets

(51) Int. Cl.
H04W 72/04 (2009.01)
H04W 48/10 (2009.01)
H04L 5/00 (2006.01)
H04W 48/12 (2009.01)

(52) U.S. Cl.
CPC ....... *H04W 56/00* (2013.01); *H04W 72/0446* (2013.01)

(56) References Cited

U.S. PATENT DOCUMENTS

| | | | |
|---|---|---|---|
| 2009/0067352 A1* | 3/2009 | Wang | H04B 7/2615 370/280 |
| 2011/0007673 A1 | 1/2011 | Ahn et al. | |
| 2011/0039499 A1* | 2/2011 | Zhang | H04W 74/0833 455/67.11 |
| 2011/0069672 A1 | 3/2011 | Lee et al. | |
| 2012/0230273 A1* | 9/2012 | He | H04L 1/1887 370/329 |
| 2012/0327895 A1 | 12/2012 | Wallen et al. | |
| 2013/0004465 A1 | 1/2013 | Aberman | |
| 2013/0044651 A1* | 2/2013 | Wang | H04W 72/0406 370/280 |
| 2013/0083753 A1 | 4/2013 | Lee et al. | |
| 2013/0128782 A1 | 5/2013 | Boixadera et al. | |
| 2013/0301524 A1 | 11/2013 | Xu et al. | |
| 2014/0140271 A1* | 5/2014 | Devarasetty | H04W 4/18 370/328 |
| 2014/0302867 A1* | 10/2014 | Mizusawa | H04W 16/16 455/452.1 |
| 2014/0334478 A1 | 11/2014 | Cheng et al. | |
| 2014/0362752 A1 | 12/2014 | Jha et al. | |
| 2014/0369243 A1* | 12/2014 | Guo | H04W 56/0015 370/280 |
| 2015/0032715 A1 | 1/2015 | Stampleman et al. | |
| 2015/0079938 A1 | 3/2015 | Jung et al. | |
| 2015/0085717 A1* | 3/2015 | Papasakellariou | H04L 5/14 370/280 |
| 2015/0327155 A1 | 11/2015 | Lee et al. | |
| 2016/0227345 A1 | 8/2016 | Xu et al. | |
| 2016/0344515 A1* | 11/2016 | Aiba | H04L 1/1812 |
| 2016/0374109 A1 | 12/2016 | Rico Alvarino et al. | |
| 2017/0037390 A1 | 2/2017 | Greiner-Stoeffele et al. | |
| 2017/0373902 A1 | 12/2017 | Zhang et al. | |

FOREIGN PATENT DOCUMENTS

| | | |
|---|---|---|
| CN | 103959682 A | 7/2014 |
| CN | 103959876 A | 7/2014 |
| CN | 104104483 A | 10/2014 |
| EP | 2947791 A1 | 11/2015 |
| WO | WO-2009116751 A2 | 9/2009 |
| WO | 2011017281 A1 | 2/2011 |
| WO | 2013025290 A1 | 2/2013 |
| WO | WO 2013131262 A1 | 9/2013 |
| WO | 2013170121 A1 | 11/2013 |
| WO | WO-2013183966 A1 | 12/2013 |
| WO | WO-2014112850 A1 | 7/2014 |
| WO | WO 2015066645 A1 | 5/2015 |
| WO | 2015143244 A1 | 9/2015 |
| WO | 2016205123 A1 | 12/2016 |

OTHER PUBLICATIONS

Jian et al., "A Fast Method for Downlink Cell Search in TD-SCDMA," 11th IEEE Singapore International Conference on Communication Systems, 2008 (ICCS 2008), Guangzhou, Nov. 19-21, 2008, pp. 1569-1573, XP_31400301A, Institute of Electrical and Electronics Engineers.
NTT Docomo, Inc., "Introduction of Additional TDD UL/DL Configuration in Rel-12," 3GPP TSG-RAN #62, RP-131781, Busan, Korean, Dec. 3-6, 2013, 11 pgs., XP_50733943A, 3rd Generation Partnership Project.
NEC Group: "Maximum Bandwidth Reduction for Low-Cost MTC UE based on LTE", 3GPP Draft; R1-120259, 3rd Generation Partnership Project (3GPP), Mobile Competence Centre, 650, Route Des Lucioles, F-06921 Sophia-Antipolis Cedex, France, vol. RAN WG1, no. Dresden, Germany, 20120206-20120210, Jan. 31, 2012 (Jan. 31, 2012), 6 Pages, XP050562813, title section 2.2 Bandwidth sharing.
European Search Report—EP19152933—Search Authority—Munich—dated Apr. 28, 2019.
ETSI: "LTE; Evolved Universal Terrestrial Radio Access (E-UTRA); Physical channels and modulation, 3GPP TS 36.211 Version 10.7.0 Release 10", Apr. 2013, 103 pages.
KT Corp: "MIB for Rel-13 MTC", 3GPP TSG RAN WG2 Meeting #90, 3GPP Draft; R2-152727, May 24, 2015, XP050973997, 2 Pages.
Nokia Networks: "Using MIB Spare Bits for MTC", 3GPP TSG-RAN WG1 Meeting #80bis, R1-151315, Belgrade, Serbia, Apr. 20-24, 2015, 3 pages, XP050934194, URL:http://www.3gpp.org/ftp/tsg_ran/WG1_RL1/TSGR1_80b/Docs/R1-151315.zip.
Taiwan Search Report—TW105118626—TIPO—dated Oct. 30, 2019.
CATT: "Further Discussion on PBCH Coverage Improvement for MTC UEs," 3GPP Draft; R1-140074, 3GPP TSG RAN WG1 Meeting #76, 3rd Generation Partnership Project (3GPP), Mobile Competence Centre ; 650, Route Des Lucioles ; F-06921 Sophia-Antipolis Cedex ; France vol. RAN WG1, no. Prague, Czech Republic; 20140210-20140214 Jan. 31, 2014 (Jan. 31, 2014), XP050751571, Retrieved from the Internet: URL:http://www.3gpp.org/ftp/tsg_ran/WG1_RL1/TSGR1_76/Docs/ [retrieved on Jan. 31, 2014] the whole document.
Ericsson: "Scheduling and Transmission of SIB1", 3GPP TSG-RAN WG2#61bis, R2-081485, 3GPP, Mar. 22, 2008, 3 pages.
Intel Corporation: "System Information Reception for Rel-13 LC UE and EC Mode", 3GPP TSG-RAN WG2#89, R2-150171, 3GPP, Jan. 31, 2015, 7 pages.
KT Corp: "Views on MTC SIB transmission", 3GPP TSG-RAN WG1#81 R1-153292, 3GPP, May 16, 2015, 5 Pages.
Lenovo: "Remaining Issue of Common Control Messages", 3GPP TSG-RAN WG1#81, R1-153263, 3GPP, May 15, 2015, 7 Pages.
Nokia Networks: "SIB Scheduling for Low Complexity MTC", R2-152110, 3GPP TSG-RAN WG2 Meeting #90, Fukuoka, Japan, May 25-29, 2015, 4 Pages.
Nokia Networks: "MTC SIB Transmission", 3GPP TSG-RAN WG1#81, R1-152551, 3GPP, May 15, 2015, 5 Pages.
NTT Docomo: "Views on SIB Design in Rel-13 Low Complexity MTC", 3GPP TSG-RAN WG1#81, R1-153327, 3GPP, May 16, 2015, 5 Pages.
Samsung: "SIB-1 Scheduling for Low Cost UEs", 3GPP TSG-RAN WG1#81, R1-152842, 3GPP, May 15, 2015, 5 Pages.
ZTE: "Coverage Enhancement of Physical Broadcast Channel and SIB Transmission", R1-134302, 3GPP TSG RAN WG1 Meeting #74bis, Guangzhou, China, Oct. 7-11, 2013, 7 Pages.
ZTE: "Discussion on SIB for MTC Enhancement", 3GPP TSG-RAN WG1#81 R1-152962, 3GPP, May 15, 2015, 7 Pages.
CATT: "Common Message Transmission for Rel-13 Low Complexity UEs and UEs in Enhanced Coverage", 3GPP Draft, 3GPP TSG RAN WG1 Meeting #81, R1-152562, May 24, 2015, May 25-29, 2015, XP050971649, 3 pages.

* cited by examiner

SYSTEM TYPE DEPENDENT MASTER INFORMATION BLOCK (MIB)

CROSS REFERENCES

The present application for patent claims priority to U.S. Provisional Patent Application No. 62/151,379 by Chen et al., entitled "System Type Dependent Master Information Block (MIB)," filed Apr. 22, 2015, assigned to the assignee hereof.

BACKGROUND

The following relates generally to wireless communication, and more specifically to system type dependent master information blocks (MIBs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, such as when a UE is a low cost or low complexity device, a base station may transmit system information in a dedicated system information message. This message may be transmitted in a shared channel without specifying the resources used for transmission in a control channel message. However, without the control channel the UE may have trouble locating the resources used for the system information message.

SUMMARY

A user equipment (UE) may determine a duplexing configuration (e.g., frequency division duplexing (FDD) or time division duplexing (TDD)) of a carrier based on one or more synchronization signals. The UE may then receive a master information block (MIB) on the carrier, and may interpret one or more fields of the MIB based on the duplexing configuration of the carrier. The configuration dependent fields may include a special subframe field, a system information location field, or both. In some cases, such as in a TDD configuration, the UE may postulate a special subframe configuration of the carrier in order to receive the MIB, and may update the postulated special subframe configuration after receiving the MIB.

A method of wireless communication is described. The method may include determining a duplexing configuration of a carrier, receiving a MIB on the carrier, and interpreting at least one field of the MIB based at least in part on the duplexing configuration of the carrier.

An apparatus for wireless communication is described. The apparatus may include means for determining a duplexing configuration of a carrier, means for receiving a MIB on the carrier, and means for interpreting at least one field of the MIB based at least in part on the duplexing configuration of the carrier.

A further apparatus for wireless communication is described. The apparatus may include a processor, memory in electronic communication with the processor, and instructions stored in the memory and operable, when executed by the processor, to cause the apparatus to determine a duplexing configuration of a carrier, receive a MIB on the carrier, and interpret at least one field of the MIB based at least in part on the duplexing configuration of the carrier.

A non-transitory computer-readable medium storing code for wireless communication is described. The code may include instructions executable to determine a duplexing configuration of a carrier, receive a MIB on the carrier, and interpret at least one field of the MIB based at least in part on the duplexing configuration of the carrier.

In some examples of the method, apparatuses, or non-transitory computer-readable medium described herein, the duplexing configuration comprises a time division duplex (TDD) configuration or a frequency division duplex (FDD) configuration. Additionally or alternatively, in some examples the at least one field of the MIB comprises a special subframe configuration.

In some examples of the method, apparatuses, or non-transitory computer-readable medium described herein, the special subframe configuration comprises a reduced downlink pilot time slots (DwPTS) set. Additionally or alternatively, in some examples the at least one field of the MIB comprises a system information block (SIB) location field. Additionally or alternatively, in some examples the at least one field of the MIB comprises a number of repetitions of the SIB location field.

In some examples of the method, apparatuses, or non-transitory computer-readable medium described herein, the SIB location field is indicative of one or more downlink (DL) subframe options for SIB1. Additionally or alternatively, some examples may include processes, features, means, or instructions for postulating a special subframe configuration based at least in part on the TDD configuration of the carrier, wherein the MIB is received according to the postulated special subframe configuration.

In some examples of the method, apparatuses, or non-transitory computer-readable medium described herein, the postulated special subframe configuration comprises an eleven-symbol downlink pilot time slot (DwPTS), a nine-symbol DwPTS, a one-symbol guard period, a two-symbol uplink pilot time slot (UpPTS), or any combination thereof. Additionally or alternatively, some examples may include processes, features, means, or instructions for updating the postulated special subframe configuration based at least in part on the received MIB.

Some examples of the method, apparatuses, or non-transitory computer-readable medium described herein may further include processes, features, means, or instructions for receiving one or more synchronization signals, wherein the duplexing configuration is determined based at least in part on the one or more synchronization signals.

A method of wireless communication is described. The method may include identifying a duplexing configuration of a carrier, configuring a MIB with at least one field based at least in part on the duplexing configuration, and broadcasting the MIB on the carrier.

An apparatus for wireless communication is described. The apparatus may include means for identifying a duplexing configuration of a carrier, means for configuring a MIB with at least one field based at least in part on the duplexing configuration, and means for broadcasting the MIB on the carrier.

A further apparatus for wireless communication is described. The apparatus may include a processor, memory in electronic communication with the processor, and instructions stored in the memory and operable, when executed by the processor, to cause the apparatus to identify a duplexing configuration of a carrier, configure a MIB with at least one field based at least in part on the duplexing configuration, and broadcast the MIB on the carrier.

A non-transitory computer-readable medium storing code for wireless communication is described. The code may include instructions executable to identify a duplexing configuration of a carrier, configure a MIB with at least one field based at least in part on the duplexing configuration, and broadcast the MIB on the carrier.

Some examples of the method, apparatuses, or non-transitory computer-readable medium described herein may further include processes, features, means, or instructions for transmitting one or more synchronization signals based at least in part on the duplexing configuration. Additionally or alternatively, in some examples the duplexing configuration comprises a TDD configuration or an FDD configuration.

In some examples of the method, apparatuses, or non-transitory computer-readable medium described herein, the at least one field of the MIB comprises a special subframe configuration. Additionally or alternatively, in some examples the at least one field of the MIB comprises a system information block (SIB) location field. Additionally or alternatively, in some examples the at least one field of the MIB comprises a number of repetitions of the SIB location field.

BRIEF DESCRIPTION OF THE DRAWINGS

Aspects of the disclosure are described in reference to the following figures.

DETAILED DESCRIPTION

Figure 1:
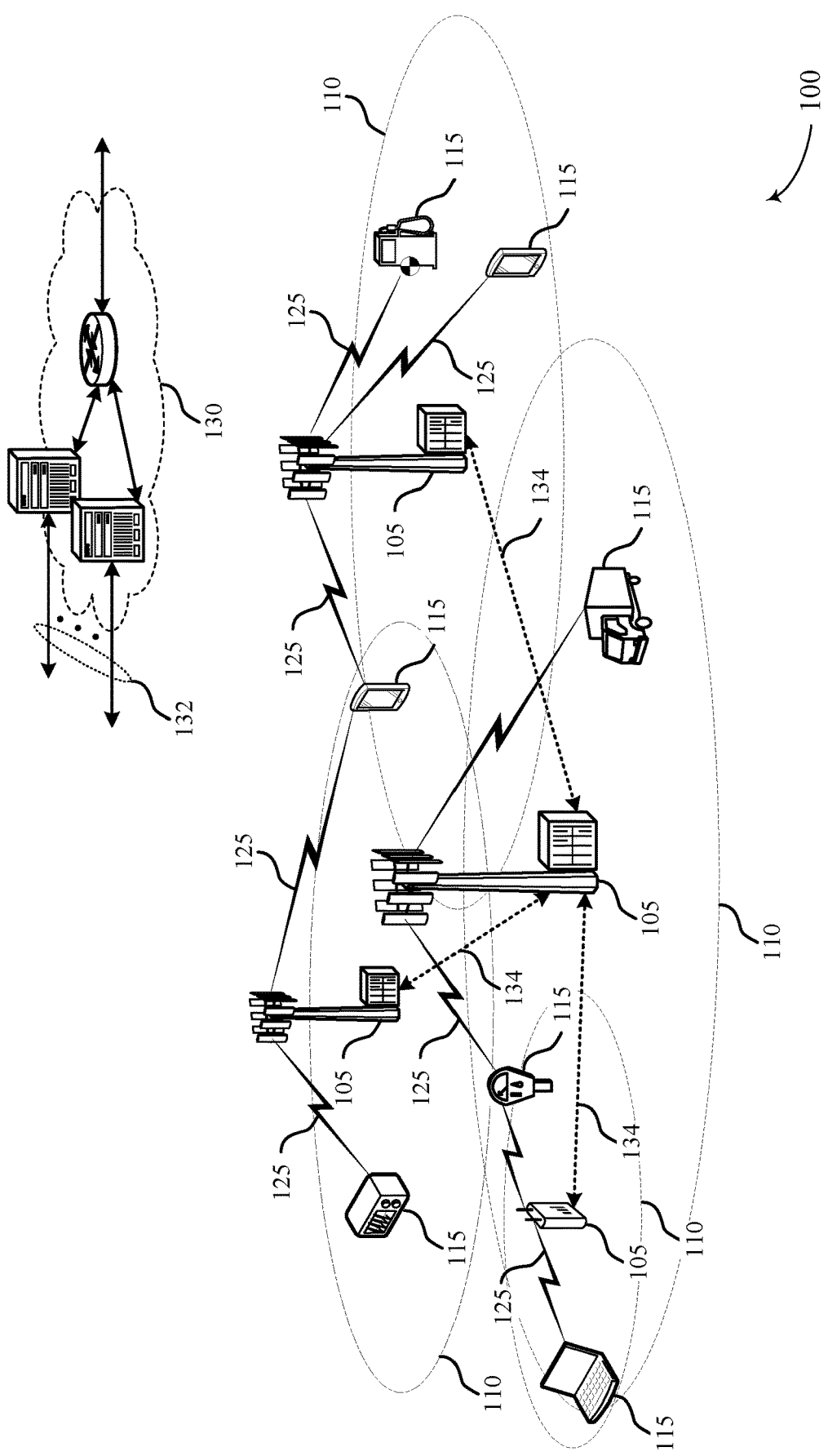
FIG. 1 illustrates an example of a wireless communications system that supports system type dependent master information block (MIB) operation in accordance with various aspects of the present disclosure.

Different communication types or user equipments (UEs) may be categorized based on UE capabilities. Certain categories of UE may operate with and benefit from utilizing different system information blocks (SIBs) and MIBs, which may include different information depend on system or carrier type. For example, machine type communications (MTC) may be categorized as category 0. Different categories may be associated with different channel configurations. For example, low cost, low complexity, and MTC devices may be associated with dedicated system information messages and coverage enhancement techniques, and may benefit from system dependent MIBs.

To facilitate MTC operation, bits from the MIB may be reused for MTC purposes. Also, the MIB may be configured and interpreted based on the duplexing configuration. When determining the subframe for PBCH repetition in a time division duplex (TDD) system, a number of factors may be considered. For example, PBCH repetition may avoid transmission during the same subframe as transmission of SIB1. In some cases, how may DL subframes, including special subframes, are available in the cell may be a factor in determining the subframe for PBCH repetition. Another factor may be which DL subframes are configured for enhanced multimedia broadcast multicast service (eMBMS) subframes, positioning reference signal (PRS) subframes, or other subframes. PDSCH may not be transmitted depending on the configuration of DL subframes. It should be noted, that while these techniques are discussed relating to MTC UEs, they may be used for other UEs, such as non-MTC UEs.

In a frequency division duplex (FDD) system, determining the subframe for PBCH repetition may be based on the location of SIB1 or the configuration of different DL subframes (e.g., which frames are configured for eMBMS subframes, positioning reference signals (PRS) subframes, etc.). Depending on the configuration of different DL subframes, PDSCH may not be transmitted.

At times, SIB1 for MTC may be transmitted without a control channel. This may imply it is appropriate for the time or frequency location, the TBS of the SIB1, or the MCS of the SIB1 to have a fixed or predefined value, or a value specified in the MIB. Further, complications may arise regarding the configurations of subframes, such as MBSFN configuration, TDD configuration, etc. For example, knowledge of the location of the SIB1 may be needed to decode the SIB1, and the SIB1 may need to be decoded to determine the subframe configurations. However, the subframe configurations may be beneficial in determining the location of the SIB1.

For a TDD carrier, a special subframe configuration may need to be selected to address cell coverage. For instance, large guard period, and, thus a smaller downlink pilot time slot (DwPTS), may be employed to address a large cell area due to large propagation delay. Or, a large guard period may be necessary to minimize interference from other cells' DL transmissions. In some cases, a UE may be unaware of a DwPTS configuration before decoding a MIB. Additionally, certain factors may be relevant to whether and when a UE may decode a MIB.

Thus, a UE may identify the system type (e.g., duplexing configuration) via one or more synchronization signals by the time the UE starts to decode PBCH. Because FDD and TDD systems may have different needs, the information carried in PBCH may be different (e.g., designed for the FDD or TDD system). As a result, a MIB may include some information fields that are common to both TDD and FDD (e.g., information entries to indication SIB1 frequency location, time location, or TBS), and the MIB may include some fields that are specific to (or interpreted differently) for FDD or TDD carriers. After a UE detects whether a carrier is FDD or TDD using PSS/SSS, and after it decodes PBCH, the UE may interpret the PBCH content based on whether the carrier (or system) is an FDD or TDD system.

Aspects of the disclosure are initially described below in the context of a wireless communication system. Aspects of the disclosure are further illustrated by and described with reference to apparatus diagrams, system diagrams, and flowcharts that relate to system type dependent master information block (MIB).

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-advanced (LTE-a) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Some types of wireless devices may provide for automated communication. Automated wireless devices may include those implementing Machine-to-Machine (M2M) communication or Machine Type Communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Base stations 105 and UE2 115 may communicate using bidirectional communications based on frequency division duplexing (FDD) (e.g., using paired spectrum resources) or time division duplexing (TDD) operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a guard period.

UL-DL configurations with switch-point periodicity equal to the frame period (e.g., 10 ms) or half of the frame period (e.g., 5 ms) may also be supported. For example, TDD frames may include one or more special frames, and the period between special frames may determine the TDD DL-to-UL switch-point periodicity for the frame. In some cases, certain symbols of the special subframes may be designated for downlink use (called downlink pilot time slots (DwPTS)) and for uplink use (called uplink pilot time slots (UpPTS)), separated by a guard symbol. Use of TDD offers flexible deployments without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplex (TDD) systems, may transmit an SSS but not a PSS. Both the PSS and the SSS may be located in the central 62 and 72 subcarriers of a carrier, respectively. After receiving the PSS and SSS, the UE 115 may receive a MIB, which may be transmitted in the physical broadcast channel (PBCH). The MIB may contain system bandwidth information, a system frame number (SFN), and a physical HARQ indicator channel (PHICH) configuration. After decoding the MIB, the UE 115 may receive one or more system information block (SIBs). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, SRS, and cell barring.

After completing initial cell synchronization, a UE 115 may decode the MIB, SIB1 and SIB2 prior to accessing the network. The MIB may be transmitted on PBCH and may utilize the first 4 orthogonal frequency division multiple access (OFDMA) symbols of the second slot of the first subframe of each radio frame. It may use the middle 6 resource block (RBs) (72 subcarriers) in the frequency domain. The MIB carries a few important pieces of information for UE initial access, including: downlink (DL) channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code. According to aspects of the present disclosure, certain fields of the MIB may be configured by a base station 105 and interpreted by a UE 115 based on the duplexing configuration. For example, a TDD MIB may include fields indicative of a special subframe configuration or a SIB1 location.

After reading a MIB (either a new version or a copy), the UE 115 may can try different phases of a scrambling code until it gets a successful cyclic redundancy check (CRC) check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell 105. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames.

In some cases, low cost, low complexity of MTC devices may utilize a dedicated SIB, which may take the place of SIB1. This may be known as an MTC SIB, or MTC SIB1. According to the present disclosure, an MTC SIB or a default SIB1 may be located by interpreting fields of a duplexing configuration dependent MIB.

Accordingly, a UE 115 may determine a duplexing configuration (e.g., FDD or TDD) of a carrier based on one or more synchronization signals. The UE 115 may then receive a MIB on the carrier, and may interpret one or more fields of the MIB based on the duplexing configuration of the carrier. The configuration dependent fields may include a special subframe field, a system information location field, or both. In some cases, such as in a TDD configuration, the UE 115 may postulate a special subframe configuration of the carrier in order to receive the MIB, and may update the postulated special subframe configuration after receiving the MIB.

Figure 2:
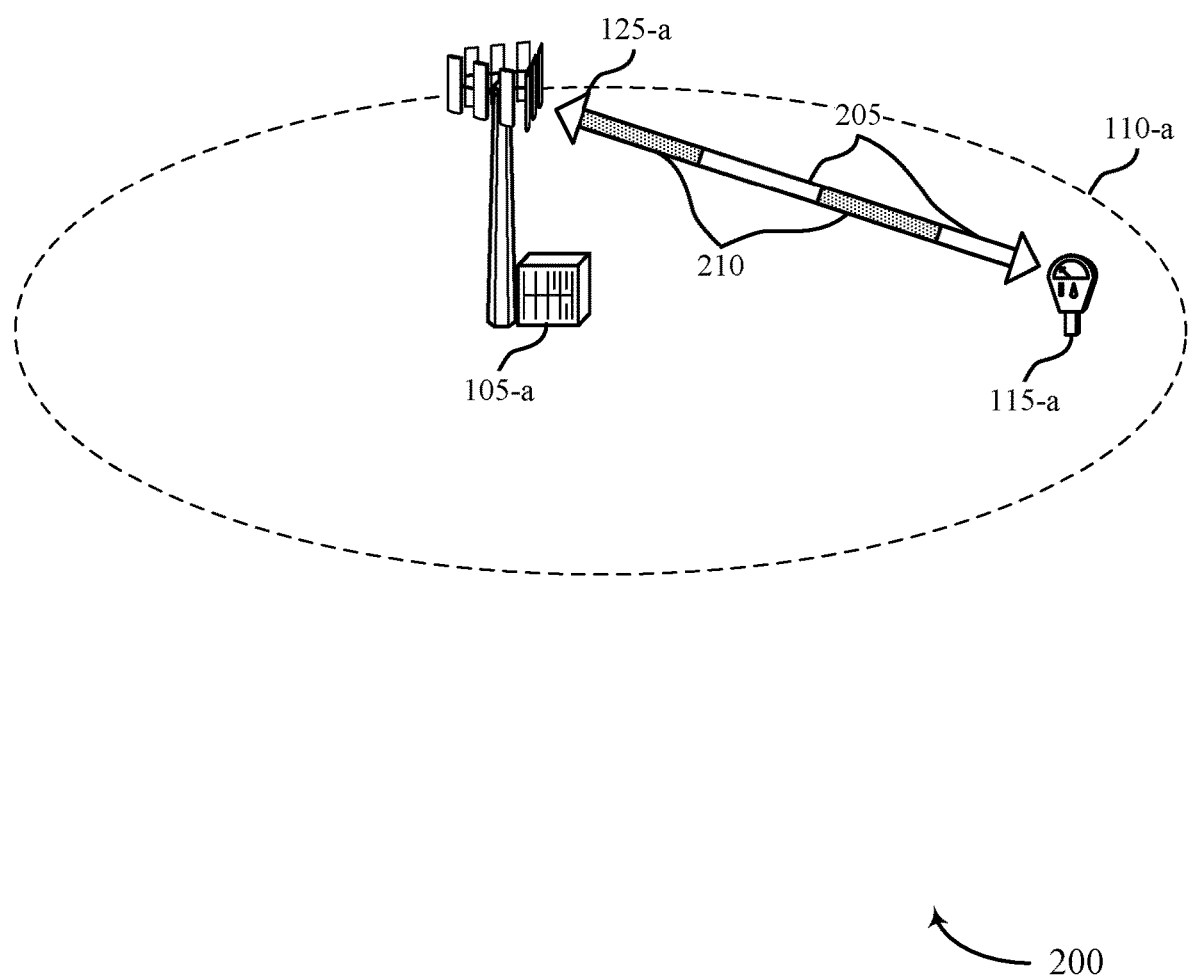
FIG. 2 illustrates an example of a wireless communications subsystem that supports system type dependent MIB operation in accordance with various aspects of the present disclosure.

FIG. 2 illustrates an example of a wireless communications subsystem 200 for system type dependent MIB in accordance with various aspects of the present disclosure. Wireless communications subsystem 200 may include a UE 115-a and base station 105-a, which may be examples of a UE 115 base station 105 described with reference to FIG. 1. In some cases, UE 115-a may be a low cost, low complexity or MTC device as described with reference to FIG. 1.

That is, in some systems such as an LTE system, UE 115-a may be categorized as category 0. Categories may have inherent communication parameters. For example, category 0 may be associated with a maximum of 1000 bits for a transport block size (TBS), rank 1 transmissions, one receive antenna, and increased switching time in half-duplex, such as 1 ms. In some cases, enhancements to MTC, such as enhanced MTC (eMTC), may be supported. The enhancements may include narrowband operation, such as at 1.4 MHz with 6 resource blocks (RBs), with support for a wider system bandwidth, such as 1.4, 3, 5, 10, 15, or 20 MHz. Further, coverage may be enhanced by as much as 15 dB.

UE 115-a and base station 105-a may communicate via communication link 125-a, which may have a duplexing configuration to support both downlink and uplink communications. For example, communication link 125-a may have a TDD configuration and may be divided into uplink time periods 205 and downlink time periods 210.

Communication link 125-a may include a physical broadcast channel (PBCH), which may carry a master information block (MIB). In some cases, the MIB may have a defined payload size of 24 bits, without a 16 bit cyclic redundancy check (CRC). The MIB may include an 8 bit system frame number, a 4 bit system bandwidth indicator, a 2 bit physical hybrid-ARQ indicator channel (PHICH) resource indicator, a 1 bit PHICH time-span indicator, and 9 reserved bits.

To enhance coverage, the PBCH may be repeated over different subframes. By repeating the PBCH over different subframes, UEs 115 in bad radio channel conditions may be covered. For example, the PBCH may be repeated in subframe 0 and at least one other subframe, for all frames. Frames may be transmitted in 40 ms cycles if repetition is configured. In some cases, the network may determine whether to configure PBCH repetitions for a cell. The PBCH repetition configuration may be a long-term property of the cell. As such, in some cases, UE 115-a may assume the PBCH repetition is the same, whether on or off, during subsequent times waking up during initial acquisition.

To facilitate MTC operation, bits from the MIB may be reused for MTC purposes. For example, the 9 reserved bits of the MIB may be used for MTC. Use of the 9 reserved bits may include 1 bit indicating support of coverage enhancement, 1 bit indicating support of release 13 MTC UE, 2 or 3 bits indicating the time frequency position of a MTC SIB1, 2 bits indicating a TBS of a MTC SIB1, 2 bits for a control format indicator (CFI), or a combination thereof. In some cases, it may be desired to reserve a number of the 9 reserved bits for future use. For example, MTC use of the 9 reserved bits may be limited to 4 or 5 of the potential 9 bits.

When determining the subframe for PBCH repetition in a time division duplex (TDD) system, a number of factors may be considered. For example, PBCH repetition may avoid transmission during the same subframe as transmission of SIB1. SIB1 may be transmitted in the center 6 RBs. In some cases, SIB1 transmission may perform subband hopping, such as to exploit frequency diversity gain, which may allow PBCH repetition to use the center 6 RBs. Further, if downlink pilot time slot (DwPTS) is available for physical downlink shared channel (PDSCH) transmission, the DwPTS may have a length of 3 symbols and PDSCH transmissions may be avoided. In some cases, how may DL subframes, including special subframes, are available in the cell may be a factor in determining the subframe for PBCH repetition. Another factor may be which DL subframes are configured for enhanced multimedia broadcast multicast service (eMBMS) subframes, positioning reference signal (PRS) subframes, or other subframes. PDSCH may not be transmitted depending on the configuration of DL subframes.

In a frequency division duplex (FDD) system (not shown), determining the subframe for PBCH repetition may be based on the location of SIB1 or the configuration of different DL subframes (e.g., which frames are configured for eMBMS subframes, PRS subframes, etc.). Depending on the configuration of different DL subframes, PDSCH may not be transmitted.

At times, SIB1 for MTC may be transmitted by base station 105-a without a control channel. This may necessitate the time or frequency location, the TBS of the SIB1, or the MCS of the SIB1 to have a fixed or predefined value, or a value specified in the MIB. Further, complications may arise regarding the configurations of subframes, such as MBSFN configuration, TDD configuration, etc. For example, knowledge of the location of the SIB1 may be needed to decode the SIB1, and the SIB1 may need to be decoded to determine the subframe configurations. However, the subframe configurations may be beneficial in determining the location of the SIB1.

In some cases, PBCH may be repeated within a frame. For example, PBCH may be transmitted in subframe 0 and in at least one other subframe of each frame, and it may be repeated in a 40 ms cycle. For FDD carriers, PBCH may be repeated in subframe 9, which may assist with coherent PBCH detection (e.g., because PBCH would be transmitted in consecutive subframes 0 and 9). For TDD carriers, PBCH may be repeated in subframe 1, which may assist with coherent PBCH detection (e.g., because PBCH would be transmitted in consecutive subframes 0 and 1).

For a TDD carrier, a DwPTS configuration may need to be selected to address cell coverage. For instance, large guard period, and, thus a smaller DwPTS, may be employed to address a large cell area (which may be a subset of coverage area 110-a) due to large propagation delay. Or, a large guard period may be necessary to minimize interference from other cells' DL transmissions.

In some cases, UE 115-a may be unaware of a DwPTS configuration before decoding a MIB. Additionally, certain factors may be relevant to whether and when UE 115-a may decode a MIB. A MIB may be present in the center 6 RBs. In some cases, if DL to UL interference is a concern, UL transmissions may not be scheduled in the center 6 RBs in subframe 1 or 2, or both. Or, if a large UL timing advance is employed for a decoding the MIB, UE 115-a, after decoding MIB and SIB1, may be scheduled in other UL subframes, or may not decode the MIB and may be scheduled in subframes 1 or 2. In view of this, if subframe 1 is used for MIB repetition, UE 115-a may assume a fixed DwPTS configuration (e.g., 11-symbol DwPTS for normal CP, 9-symbol DwPTS for extended CP; 1-symbol guard period; 2-symbol UpPTS). Once MIB or SIB1 have been decoded, UE 115-a may know an actual DwPTS length, which may be different form the assumed DwPTS configuration. But in some cases, this difference may be inconsequential. For regular traffic, UE 115-a may use the actual configuration; for MIB detection, UE 115-a may assume and use the fixed configuration.

UE 115-a may identify the system type (e.g., duplexing configuration) via PSS/SSS by the time UE 115-a starts to decode PBCH. Because FDD and TDD systems may have different needs, the information carried in PBCH may be different (e.g., designed for the FDD or TDD system). As a result, a MIB may include some information fields that are common to both TDD and FDD (e.g., information entries to indication SIB1 frequency location, time location, or TBS), and the MIB may include some fields that are specific to (or interpreted differently) for FDD or TDD carriers. After UE 115-a detects whether a carrier is FDD or TDD using PSS/SSS, and after it decodes PBCH, UE 115-a may interpret the PBCH content based on whether the carrier (or system) is an FDD or TDD system.

In some cases, a field of the MIB may be used to indicate a DwPTS configuration (e.g., 1-bit to indicate a reduced set of entries of DWPTS, such as 3 or 11 symbols). It may also include information regarding DL subframe availability. For instance, 1-bit may indicate whether UE 115-a can assume the following possible DL subframes for SIB1:0 may indicate the possible DL subframes are 0 and 5, while 1 may indicate the possible DL subframes are 9, 4, 5, and 9. This may represent the common set of DL subframes for TDD configurations #1, #2, #4, and #5. In some cases, such indications may be implicit. For example, base station 105-a may indicate that SIB1 is present in subframe 4. In some cases, FDD-specific MIBs may also have reserved bits that correspond to reserved TDD-specific information.

Figure 3:
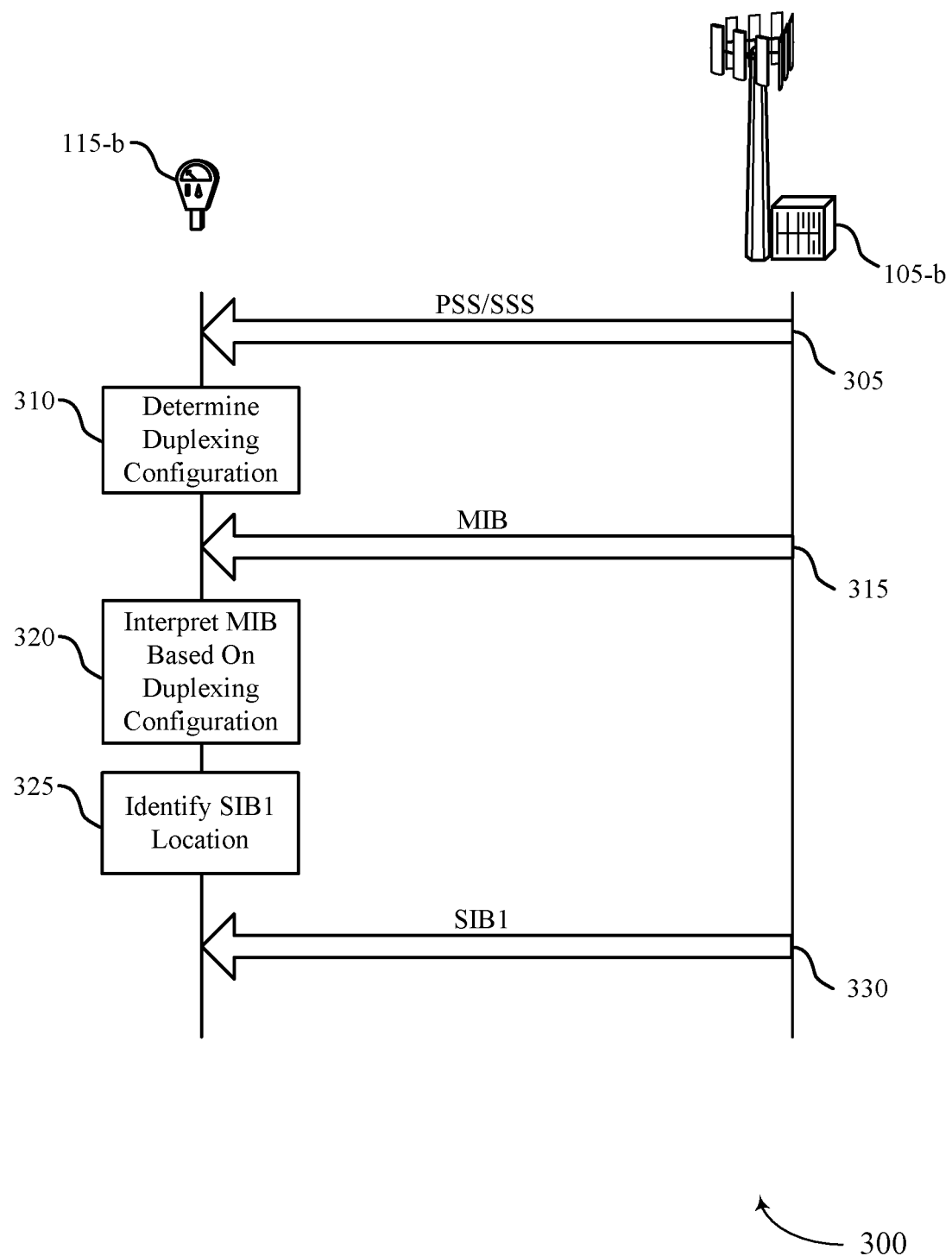
FIG. 3 illustrates an example of a process flow that supports system type dependent MIB operation in accordance with various aspects of the present disclosure.

FIG. 3 illustrates an example of a process flow 300 for system type dependent MIB in accordance with various aspects of the present disclosure. Process flow 300 may include a UE 115-b and base station 105-b, which may be examples of a UE 115 and base station 105 described with reference to FIGS. 1-2.

At 305, base station 105-b may broadcast synchronization signals such as a PSS or SSS. In some cases, base station 105-b may transmit one or more synchronization signals based at least in part on the duplexing configuration. UE 115-b may receive the one or more synchronization signals, such that the duplexing configuration is determined based at least in part on the one or more synchronization signals. In some cases, base station 105-b may identify a duplexing configuration of a carrier prior to transmitting the PSS/SSS.

At 310, UE 115-b may determine a duplexing configuration of the carrier based on the synchronization signals. In some examples the duplexing configuration comprises a TDD configuration. UE 115-b may postulate a special subframe configuration based at least in part on the TDD configuration of the carrier, such that a MIB is received according to the postulated special subframe configuration. In some examples the postulated special subframe configuration comprises an eleven-symbol DwPTS, a nine-symbol DwPTS, a one-symbol guard period, a two-symbol UpPTS, or any combination thereof.

At 315, base station 105-b may broadcast a MIB. That is, Base station 105-b may broadcast the MIB on the carrier and UE 115-b may receive the MIB on the carrier. Base station 105-b may configure the MIB with at least one field based at least in part on the duplexing configuration.

At 320, UE 115-b may interpret the MIB based on the duplexing configuration. That is, UE 115-b may interpret at least one field of the MIB based at least in part on the duplexing configuration of the carrier. In some examples the at least one field of the MIB comprises a special subframe configuration. In some examples the special subframe configuration comprises a reduced DwPTS set. In some examples the at least one field of the MIB comprises a SIB location field. In some examples, the at least one field of the MIB comprises a number of repetitions of the SIB location field. In some examples the SIB location field is indicative of one or more DL subframe options for SIB1. In some cases, UE 115-*b* may then update the postulated special subframe configuration based at least in part on the received MIB.

At 325, UE 115-*b* may identify the location or other aspects of a SIB1 (such as transport block size and modulation and coding scheme (MCS)) based on the MIB. At 330, base station 105-*b* may transmit SIB1 in a shared channel. In some case the SIB may be an MTC SIB1.

Figure 4:
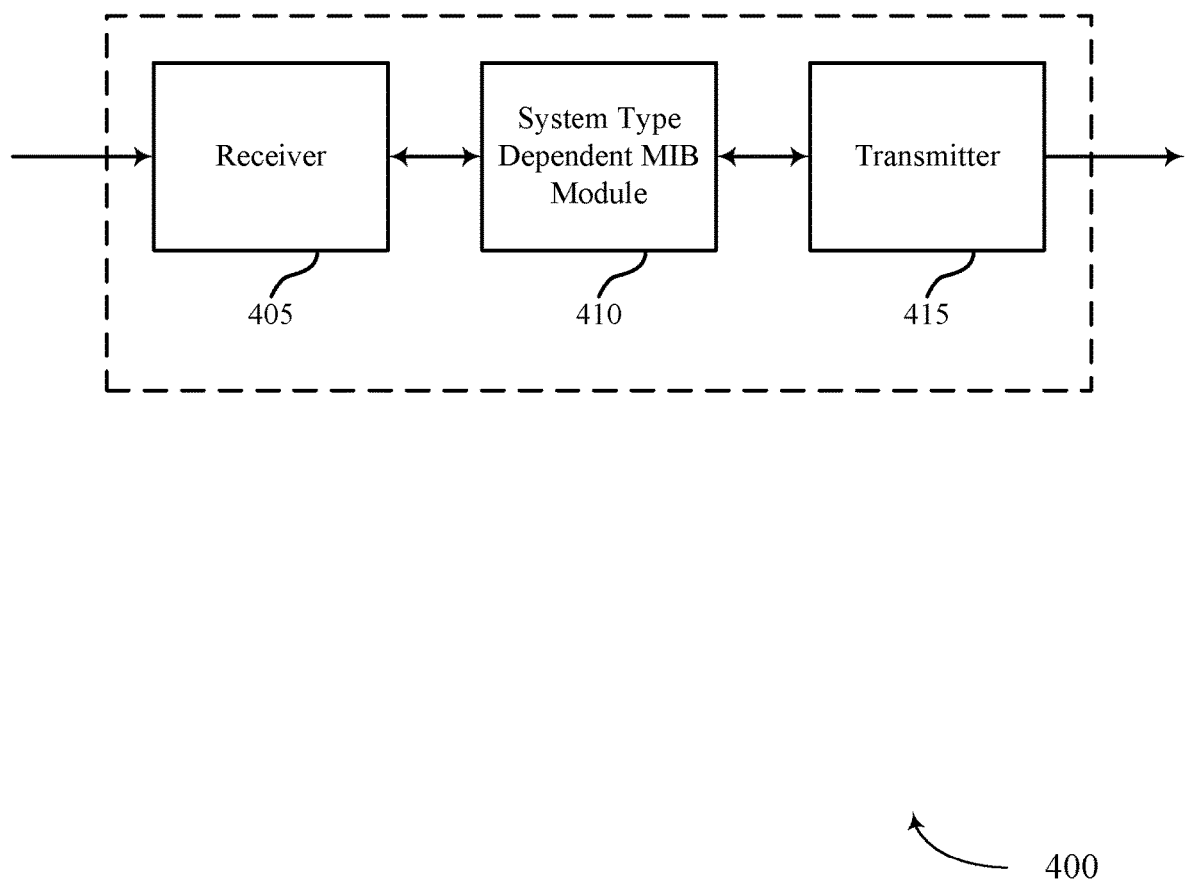
FIGS. 4-6 show block diagrams of a wireless device or devices that supports system type dependent MIB operation in accordance with various aspects of the present disclosure.

FIG. 4 shows a block diagram of a wireless device 400 configured for system type dependent MIB in accordance with various aspects of the present disclosure. Wireless device 400 may be an example of aspects of a UE 115 described with reference to FIGS. 1-3.

Wireless device 400 may include a receiver 405, a system type dependent MIB module 410, or a transmitter 415. Wireless device 400 may also include a processor. Each of these components may be in communication with each other.

The receiver 405 may receive information such as packets, user data, or control information associated with various information channels (e.g., control channels, data channels, and information related to system type dependent MIB, etc.). Information may be passed on to the system type dependent MIB module 410, and to other components of wireless device 400.

The system type dependent MIB module 410 may determine a duplexing configuration of a carrier, receive a MIB on the carrier, and interpret at least one field of the MIB based at least in part on the duplexing configuration of the carrier.

The transmitter 415 may transmit signals received from other components of wireless device 400. In some examples, the transmitter 415 may be collocated with the receiver 405 in a transceiver module. The transmitter 415 may include a single antenna, or it may include a plurality of antennas.

Figure 5:
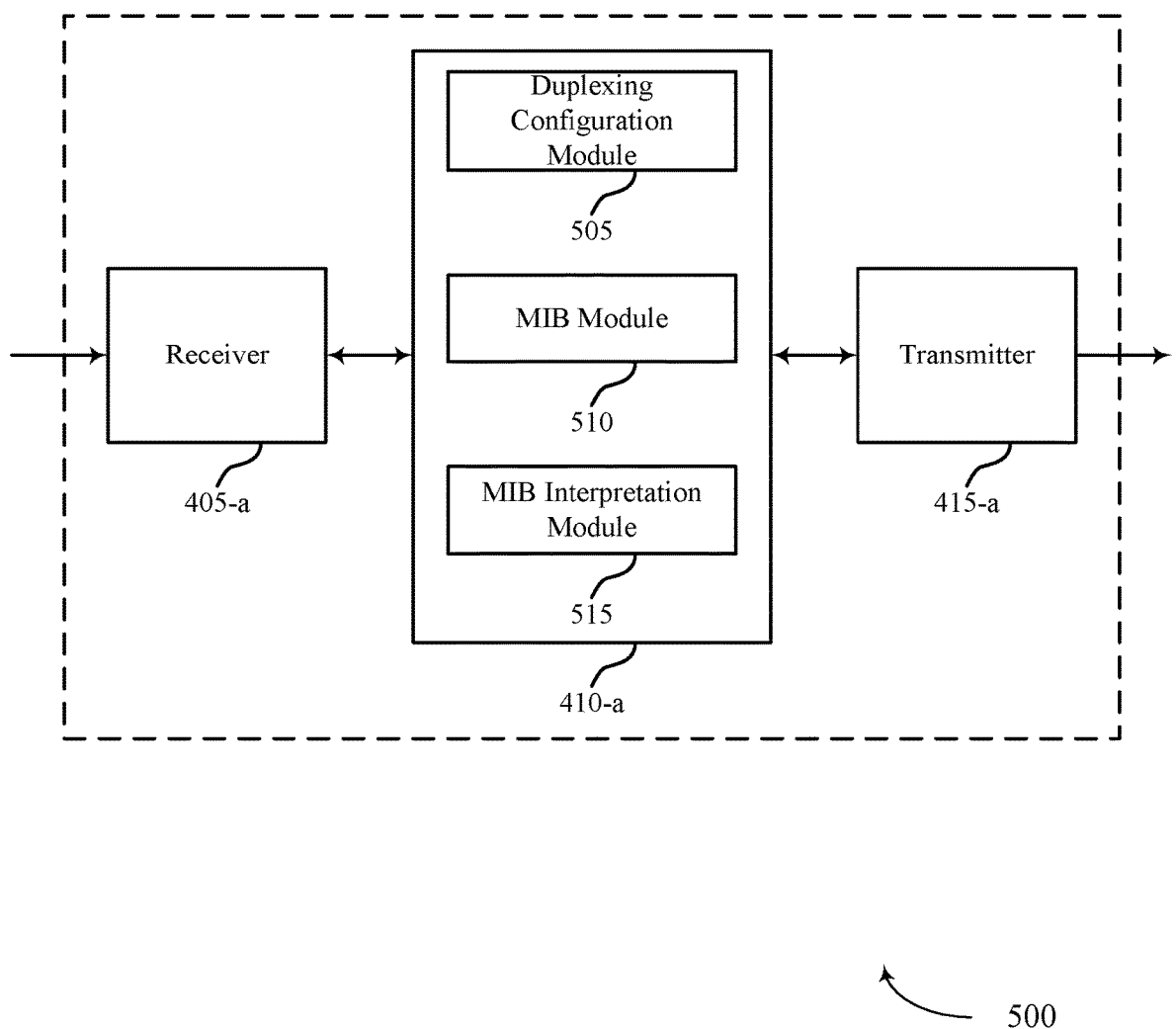

FIG. 5 shows a block diagram of a wireless device 500 for system type dependent MIB in accordance with various aspects of the present disclosure. Wireless device 500 may be an example of aspects of a wireless device 400 or a UE 115 described with reference to FIGS. 1-4. Wireless device 500 may include a receiver 405-*a*, a system type dependent MIB module 410-*a*, or a transmitter 415-*a*. Wireless device 500 may also include a processor. Each of these components may be in communication with each other. The system type dependent MIB module 410-*a* may also include a duplexing configuration module 505, a MIB module 510, and a MIB interpretation module 515.

The receiver 405-*a* may receive information which may be passed on to system type dependent MIB module 410-*a*, and to other components of wireless device 500. The system type dependent MIB module 410-*a* may perform the operations described with reference to FIG. 4. The transmitter 415-*a* may transmit signals received from other components of wireless device 500.

The duplexing configuration module 505 may determine a duplexing configuration of a carrier as described with reference to FIGS. 2-3.

The MIB module 510 may receive a MIB on the carrier as described with reference to FIGS. 2-3.

The MIB interpretation module 515 may interpret at least one field of the MIB based at least in part on the duplexing configuration of the carrier as described with reference to FIGS. 2-3.

Figure 6:
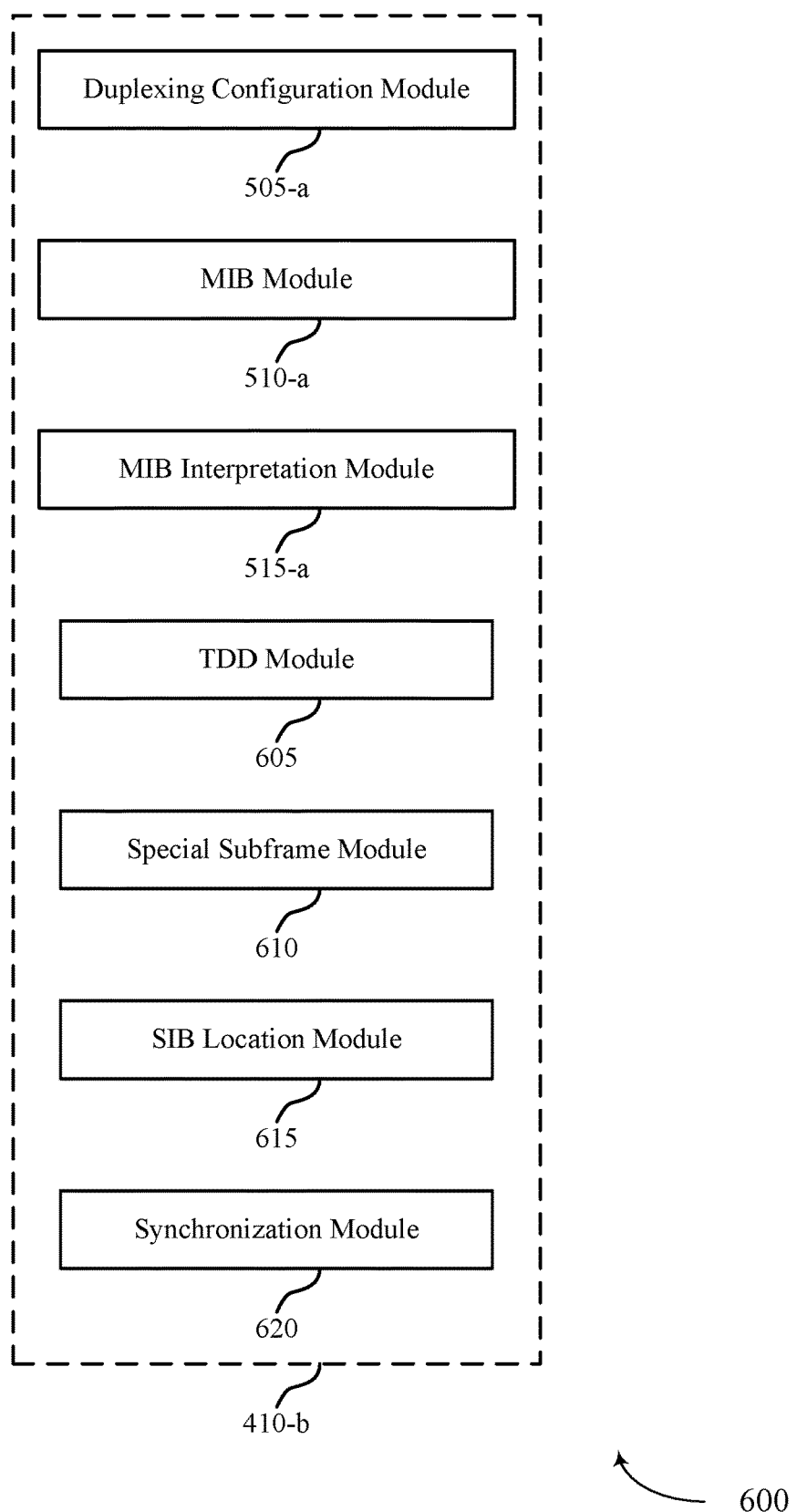

FIG. 6 shows a block diagram 600 of a system type dependent MIB module 410-*b* which may be a component of a wireless device 400 or a wireless device 500 for system type dependent MIB in accordance with various aspects of the present disclosure. The system type dependent MIB module 410-*b* may be an example of aspects of a system type dependent MIB module 410 described with reference to FIGS. 4-5. The system type dependent MIB module 410-*b* may include a duplexing configuration module 505-*a*, a MIB module 510-*a*, and a MIB interpretation module 515-*a*. Each of these modules may perform the functions described with reference to FIG. 5. The system type dependent MIB module 410-*b* may also include a TDD module 605, a special subframe module 610, a SIB location module 615, and a synchronization module 620.

The TDD module 605 may be configured such that the duplexing configuration may include a TDD configuration as described with reference to FIGS. 2-3.

The special subframe module 610 may be configured such that the at least one field of the MIB may include a special subframe configuration as described with reference to FIGS. 2-3. In some examples, the special subframe configuration comprises a reduced downlink pilot time slots (DwPTS) set. The special subframe module 610 may also postulate a special subframe configuration based at least in part on the TDD configuration of the carrier, such that the MIB is received according to the postulated special subframe configuration. In some examples, the postulated special subframe configuration comprises an eleven-symbol downlink pilot time slot (DwPTS), a nine-symbol DwPTS, a one-symbol guard period, a two-symbol uplink pilot time slot (UpPTS), or any combination thereof. The special subframe module 610 may also update the postulated special subframe configuration based at least in part on the received MIB.

The SIB location module 615 may be configured such that the at least one field of the MIB may include a SIB location field as described with reference to FIGS. 2-3. In some examples, the SIB location field may be indicative of one or more DL subframe options for SIB1.

The synchronization module 620 may receive one or more synchronization signals, such that the duplexing configuration is determined based at least in part on the one or more synchronization signals as described with reference to FIGS. 2-3.

Figure 7:
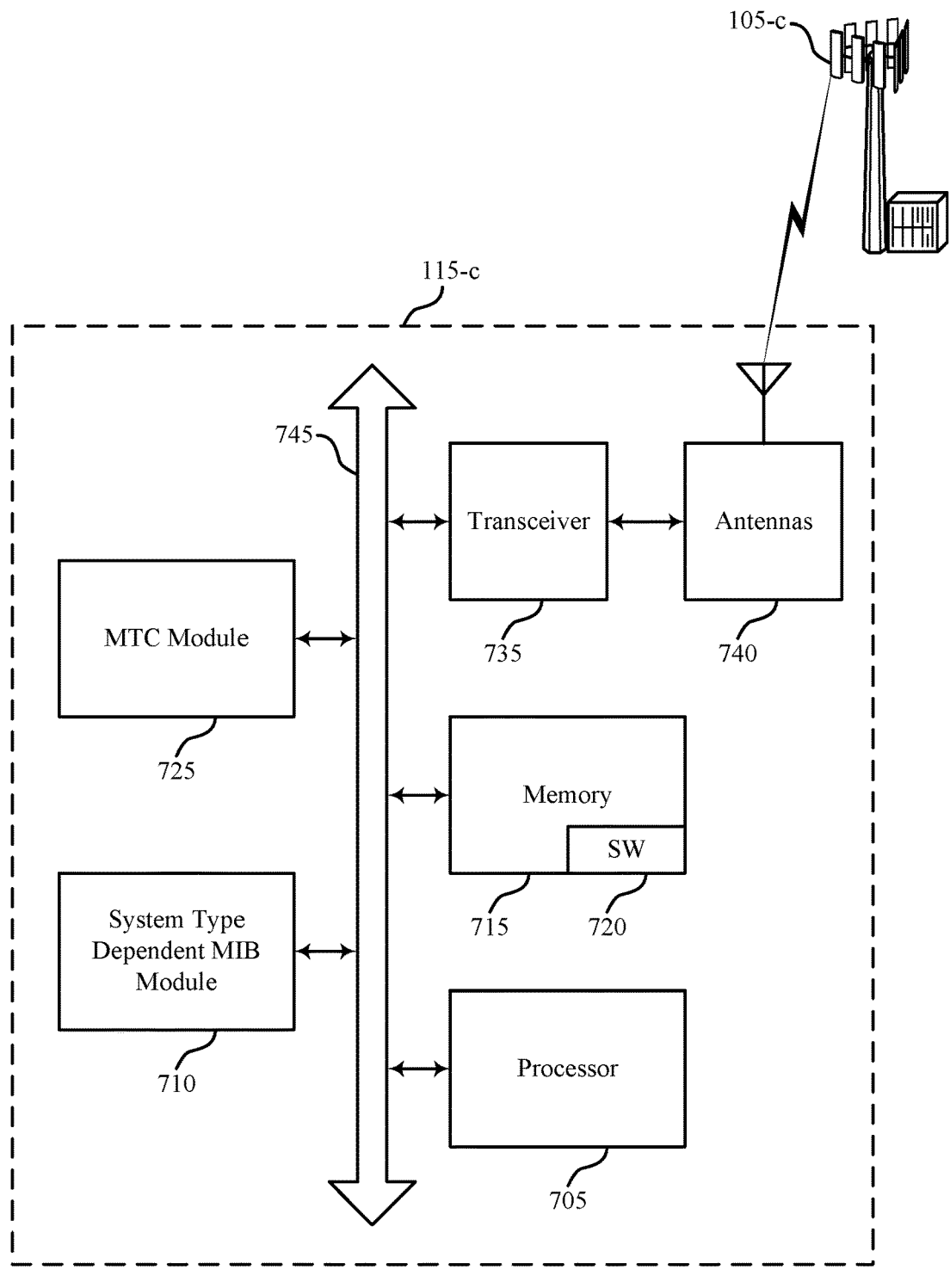
FIG. 7 illustrates a block diagram of a system including a user equipment (UE) that supports system type dependent MIB operation in accordance with various aspects of the present disclosure.

FIG. 7 shows a diagram of a system 700 including a UE 115 configured for system type dependent MIB in accordance with various aspects of the present disclosure. System 700 may include UE 115-*c*, which may be an example of a wireless device 400, a wireless device 500, or a UE 115 described with reference to FIGS. 1, 2 and 4-6. UE 115-*c* may include a system type dependent MIB module 710, which may be an example of a system type dependent MIB module 410 described with reference to FIGS. 4-6. UE 115-*c* may also include an MTC module 725. UE 115-*c* may also include components for bi-directional voice and data communications including components for transmitting communications and components for receiving communications. For example, UE 115-*c* may communicate bi-directionally with base station 105-*c*.

MTC module 725 may enable MTC specific procedures as described with reference to FIG. 1. MTC module 725 may also enable additional power saving and coverage enhancement features such as narrowband operation and additional redundancy.

UE 115-*c* may also include a processor 705, and memory 715 (including software (SW)) 720, a transceiver 735, and one or more antenna(s) 740, each of which may communicate, directly or indirectly, with one another (e.g., via buses 745). The transceiver 735 may communicate bi-directionally, via the antenna(s) 740 or wired or wireless links, with one or more networks, as described above. For example, the transceiver 735 may communicate bi-directionally with a base station 105 or another UE 115. The transceiver 735 may include a modem to modulate the packets and provide the modulated packets to the antenna(s) 740 for transmission, and to demodulate packets received from the antenna(s) 740. While UE 115-c may include a single antenna 740, UE 115-c may also have multiple antennas 740 capable of concurrently transmitting or receiving multiple wireless transmissions.

The memory 715 may include random access memory (RAM) and read only memory (ROM). The memory 715 may store computer-readable, computer-executable software/firmware code 720 including instructions that, when executed, cause the processor 705 to perform various functions described herein (e.g., system type dependent MIB, etc.). Alternatively, the software/firmware code 720 may not be directly executable by the processor 705 but cause a computer (e.g., when compiled and executed) to perform functions described herein. The processor 705 may include an intelligent hardware device, (e.g., a central processing unit (CPU), a microcontroller, an application specific integrated circuit (ASIC), etc.)

Figure 8:
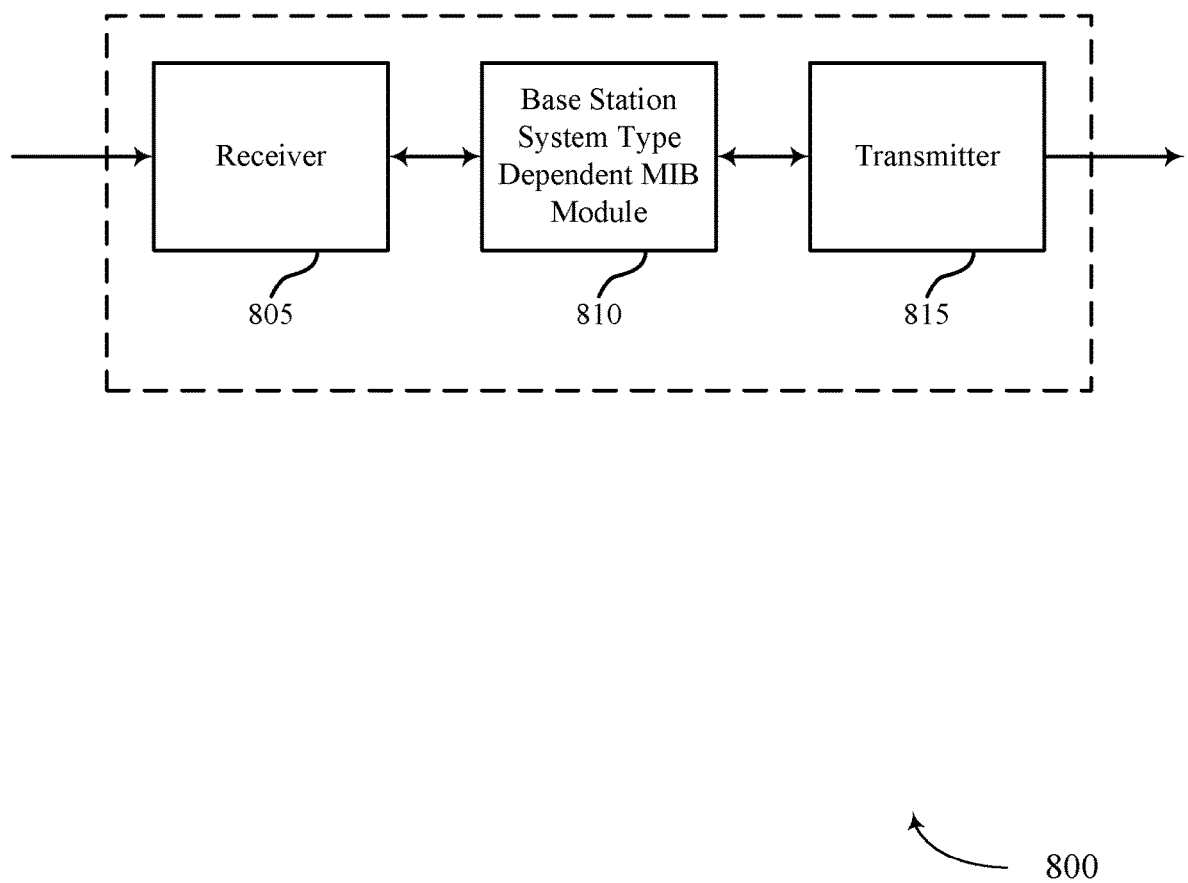
FIGS. 8-10 show block diagrams of a wireless device or devices that support system type dependent MIB operation in accordance with various aspects of the present disclosure.

FIG. 8 shows a block diagram of a wireless device 800 configured for system type dependent MIB in accordance with various aspects of the present disclosure. Wireless device 800 may be an example of aspects of a base station 105 described with reference to FIGS. 1-7. Wireless device 800 may include a receiver 805, a base station system type dependent MIB module 810, or a transmitter 815. Wireless device 800 may also include a processor. Each of these components may be in communication with each other.

The receiver 805 may receive information such as packets, user data, or control information associated with various information channels (e.g., control channels, data channels, and information related to system type dependent MIB, etc.). Information may be passed on to the base station system type dependent MIB module 810, and to other components of wireless device 800.

The base station system type dependent MIB module 810 may identify a duplexing configuration of a carrier, configure a MIB with at least one field based at least in part on the duplexing configuration, and broadcast the MIB on the carrier.

The transmitter 815 may transmit signals received from other components of wireless device 800. In some examples, the transmitter 815 may be collocated with the receiver 805 in a transceiver module. The transmitter 815 may include a single antenna, or it may include a plurality of antennas. In some examples, the transmitter 815 may broadcast the MIB on the carrier.

Figure 9:
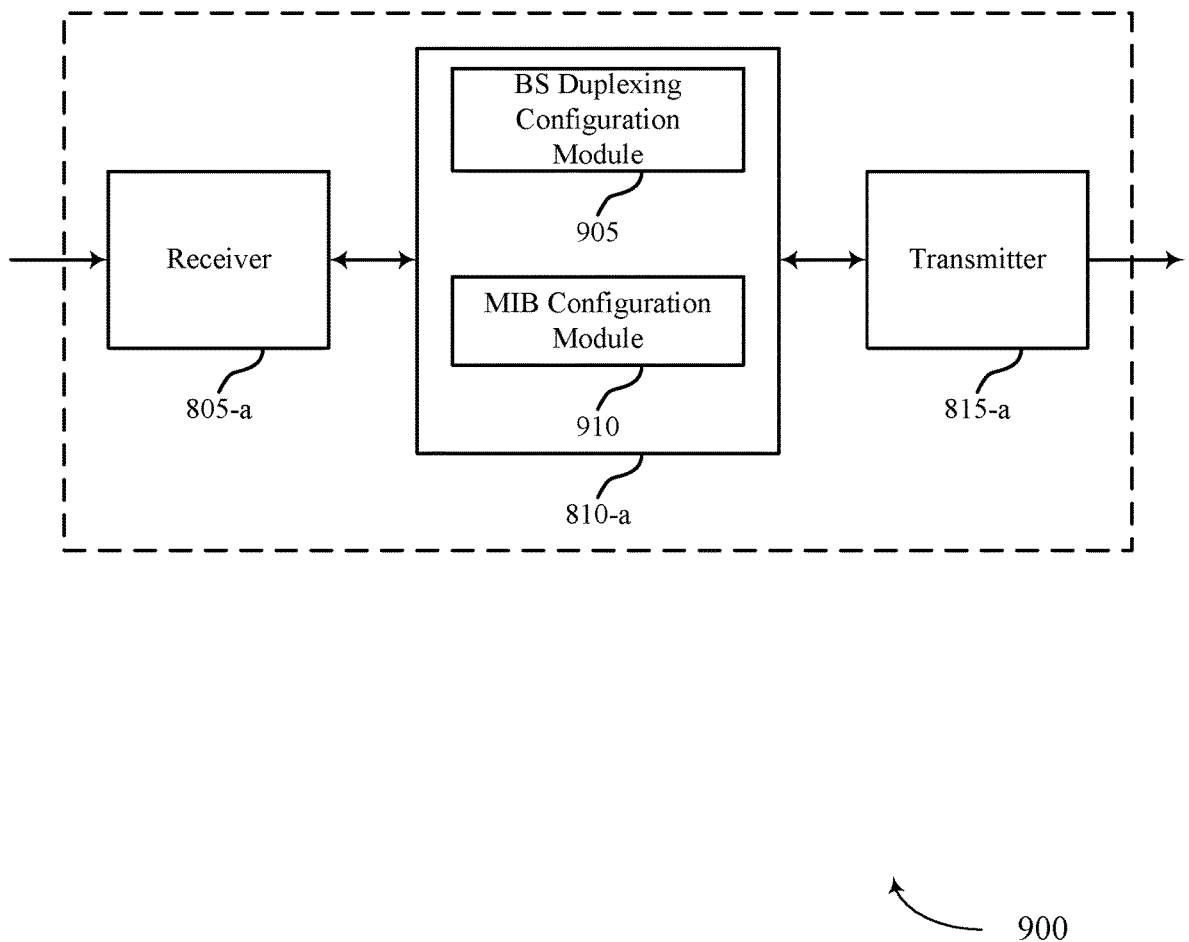

FIG. 9 shows a block diagram of a wireless device 900 for system type dependent MIB in accordance with various aspects of the present disclosure. Wireless device 900 may be an example of aspects of a wireless device 800 or a base station 105 described with reference to FIGS. 1-8. Wireless device 900 may include a receiver 805-a, a base station system type dependent MIB module 810-a, or a transmitter 815-a. Wireless device 900 may also include a processor. Each of these components may be in communication with each other. The base station system type dependent MIB module 810-a may also include a BS duplexing configuration module 905, and a MIB configuration module 910.

The receiver 805-a may receive information which may be passed on to base station system type dependent MIB module 810-a, and to other components of wireless device 900. The base station system type dependent MIB module 810-a may perform the operations described with reference to FIG. 8. The transmitter 815-a may transmit signals received from other components of wireless device 900.

The BS duplexing configuration module 905 may identify a duplexing configuration of a carrier as described with reference to FIGS. 2-3.

The MIB configuration module 910 may configure a MIB with at least one field based at least in part on the duplexing configuration as described with reference to FIGS. 2-3.

Figure 10:
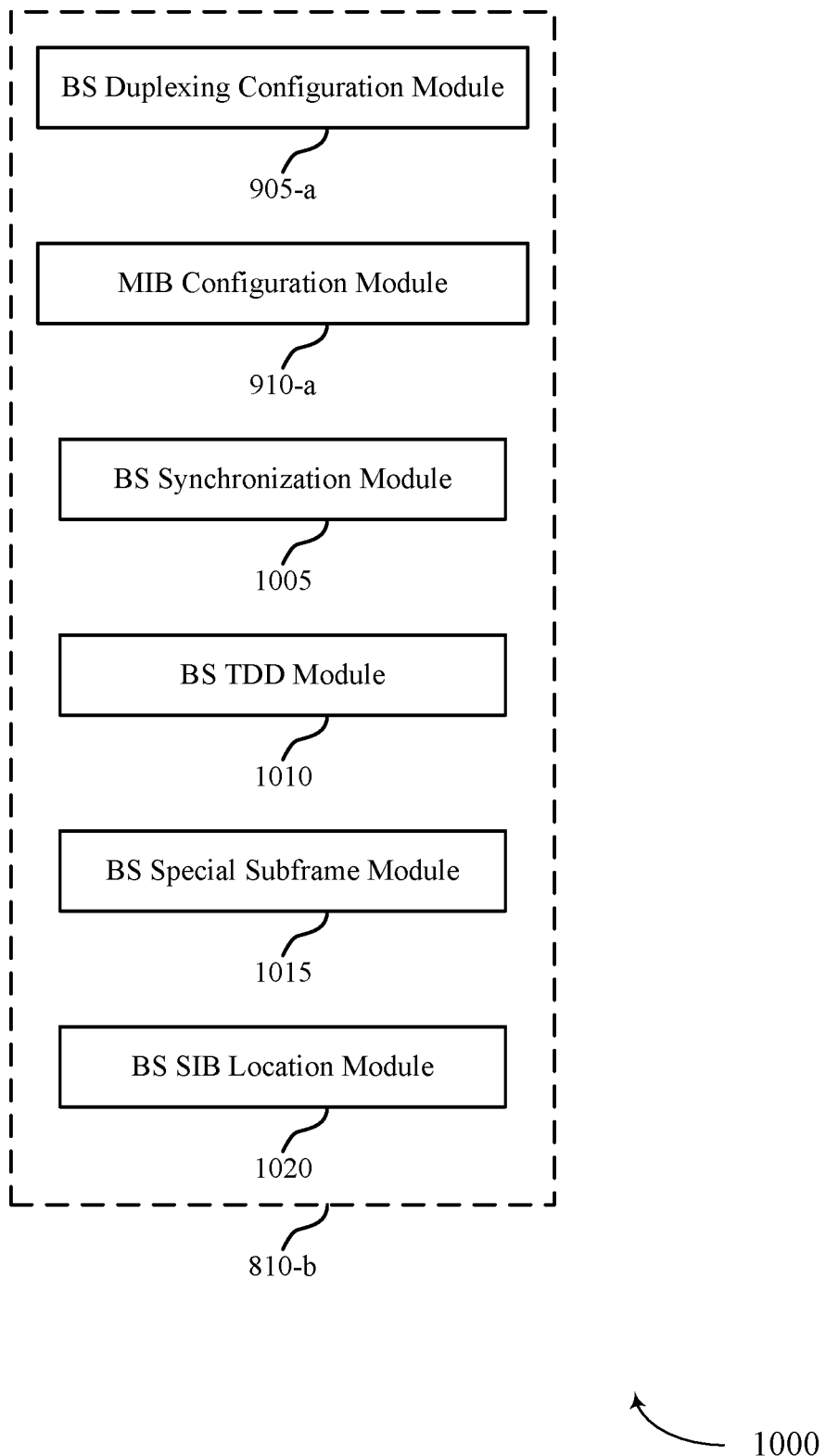

FIG. 10 shows a block diagram 1000 of a base station system type dependent MIB module 810-b which may be a component of a wireless device 800 or a wireless device 900 for system type dependent MIB in accordance with various aspects of the present disclosure. The base station system type dependent MIB module 810-b may be an example of aspects of a base station system type dependent MIB module 810 described with reference to FIGS. 8-9. The base station system type dependent MIB module 810-b may include a BS duplexing configuration module 905-a, and a MIB configuration module 910-a. Each of these modules may perform the functions described with reference to FIG. 9. The base station system type dependent MIB module 810-b may also include a BS synchronization module 1005, a BS TDD module 1010, a BS special subframe module 1015, and a BS SIB location module 1020.

The BS synchronization module 1005 may transmit one or more synchronization signals based at least in part on the duplexing configuration as described with reference to FIGS. 2-3.

The BS TDD module 1010 may be configured such that the duplexing configuration may include a TDD configuration as described with reference to FIGS. 2-3.

The BS special subframe module 1015 may be configured such that the at least one field of the MIB may include a special subframe configuration as described with reference to FIGS. 2-3.

The BS SIB location module 1020 may be configured such that the at least one field of the MIB may include a SIB location field as described with reference to FIGS. 2-3.

Figure 11:
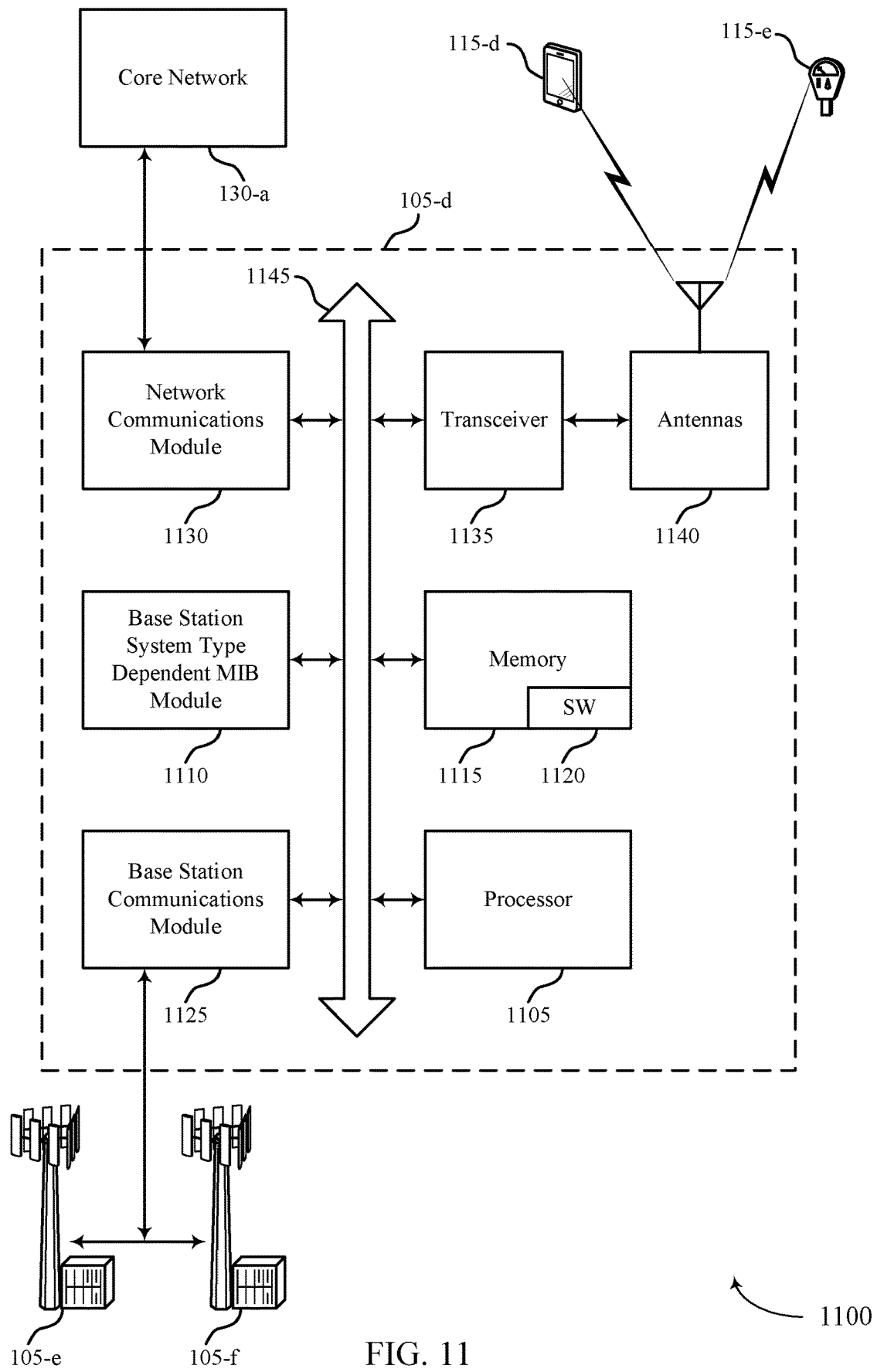
FIG. 11 illustrates a block diagram of a system including a base station that supports system type dependent MIB operation in accordance with various aspects of the present disclosure.

FIG. 11 shows a diagram of a system 1100 including a base station 105 configured for system type dependent MIB in accordance with various aspects of the present disclosure. System 1100 may include base station 105-d, which may be an example of a wireless device 800, a wireless device 900, or a base station 105 described with reference to FIGS. 1, 2 and 8-10. Base station 105-d may include a base station system type dependent MIB module 1110, which may be an example of a base station system type dependent MIB module 810 described with reference to FIGS. 8-10. Base station 105-d may also include components for bi-directional voice and data communications including components for transmitting communications and components for receiving communications. For example, base station 105-d may communicate bi-directionally with UE 115-d and UE 115-e (which may be an MTC device).

In some cases, base station 105-d may have one or more wired backhaul links. Base station 105-d may have a wired backhaul link (e.g., S1 interface, etc.) to the core network 130. Base station 105-d may also communicate with other base stations 105, such as base station 105-e and base station 105-f via inter-base station backhaul links (e.g., an X2 interface). Each of the base stations 105 may communicate with UEs 115 using the same or different wireless communications technologies. In some cases, base station 105-d may communicate with other base stations such as 105-e or 105-f utilizing base station communication module 1125. In some examples, base station communication module 1125 may provide an X2 interface within a Long Term Evolution (LTE)/LTE-A wireless communication network technology to provide communication between some of the base stations 105. In some examples, base station 105-d may communicate with other base stations through core network 130. In some cases, base station 105-d may communicate with the core network 130 through network communications module 1130.

The base station 105-d may include a processor 1105, memory 1115 (including software (SW) 1120), transceiver 1135, and antenna(s) 1140, which each may be in communication, directly or indirectly, with one another (e.g., over bus system 1145). The transceivers 1135 may be configured to communicate bi-directionally, via the antenna(s) 1140, with the UEs 115, which may be multi-mode devices. The transceiver 1135 (or other components of the base station 105-d) may also be configured to communicate bi-directionally, via the antennas 1140, with one or more other base stations (not shown). The transceiver 1135 may include a modem configured to modulate the packets and provide the modulated packets to the antennas 1140 for transmission, and to demodulate packets received from the antennas 1140. The base station 105-d may include multiple transceivers 1135, each with one or more associated antennas 1140. The transceiver may be an example of a combined receiver 805 and transmitter 815 of FIG. 8.

The memory 1115 may include RAM and ROM. The memory 1115 may also store computer-readable, computer-executable software code 1120 containing instructions that are configured to, when executed, cause the processor 1105 to perform various functions described herein (e.g., system type dependent MIB, selecting coverage enhancement techniques, call processing, database management, message routing, etc.). Alternatively, the software 1120 may not be directly executable by the processor 1105 but be configured to cause the computer, e.g., when compiled and executed, to perform functions described herein. The processor 1105 may include an intelligent hardware device, e.g., a CPU, a microcontroller, an ASIC, etc. The processor 1105 may include various special purpose processors such as encoders, queue processing modules, base band processors, radio head controllers, digital signal processor (DSPs), and the like.

The base station communications module 1125 may manage communications with other base stations 105. In some cases, a communications management module may include a controller or scheduler for controlling communications with UEs 115 in cooperation with other base stations 105. For example, the base station communications module 1125 may coordinate scheduling for transmissions to UEs 115 for various interference mitigation techniques such as beamforming or joint transmission.

The components of wireless device 400, wireless device 500, system type dependent MIB module 410, wireless device 800, wireless device 900, base station system type dependent MIN module 810, system 700, and system 100 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 12:
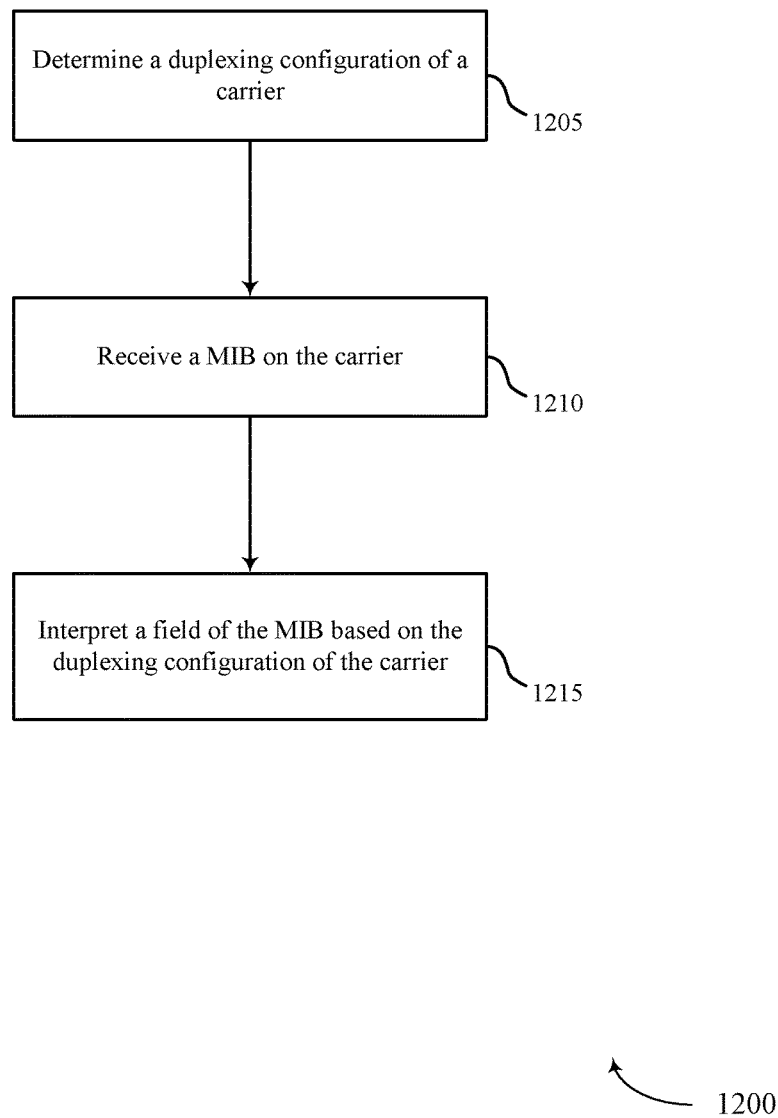
FIGS. 12-15 illustrate methods for system type dependent MIB operation in accordance with various aspects of the present disclosure.

FIG. 12 shows a flowchart illustrating a method 1200 for system type dependent MIB in accordance with various aspects of the present disclosure. The operations of method 1200 may be implemented by a UE 115 or its components as described with reference to FIGS. 1-11. For example, the operations of method 1200 may be performed by the system type dependent MIB module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware.

At block 1205, the UE 115 may determine a duplexing configuration of a carrier as described with reference to FIGS. 2-3. In certain examples, the operations of block 1205 may be performed by the duplexing configuration module 505 as described with reference to FIG. 5.

At block 1210, the UE 115 may receive a MIB on the carrier as described with reference to FIGS. 2-3. In certain examples, the operations of block 1210 may be performed by the MIB module 510 as described with reference to FIG. 5.

At block 1215, the UE 115 may interpret at least one field of the MIB based at least in part on the duplexing configuration of the carrier as described with reference to FIGS. 2-3. In certain examples, the operations of block 1215 may be performed by the MIB interpretation module 515 as described with reference to FIG. 5.

Figure 13:
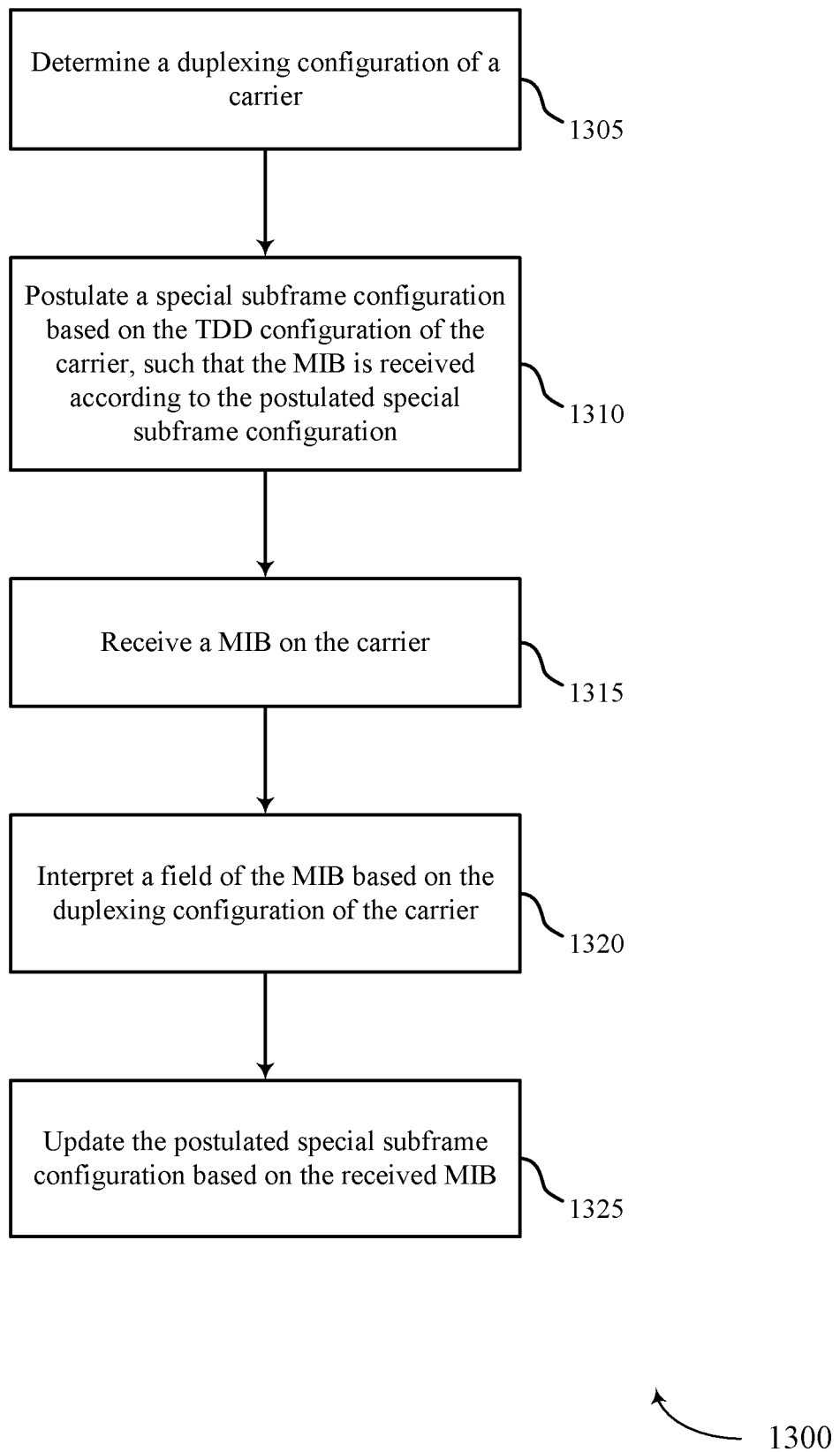

FIG. 13 shows a flowchart illustrating a method 1300 for system type dependent MIB in accordance with various aspects of the present disclosure. The operations of method 1300 may be implemented by a UE 115 or its components as described with reference to FIGS. 1-11. For example, the operations of method 1300 may be performed by the system type dependent MIB module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of method 1200 of FIG. 12.

At block 1305, the UE 115 may determine a duplexing configuration of a carrier as described with reference to FIGS. 2-3. In certain examples, the operations of block 1305 may be performed by the duplexing configuration module 505 as described with reference to FIG. 5.

At block 1310, the UE 115 may postulate a special subframe configuration based at least in part on the TDD configuration of the carrier, such that a MIB is received according to the postulated special subframe configuration as described with reference to FIGS. 2-3. In certain examples, the operations of block 1310 may be performed by the special subframe module 610 as described with reference to FIG. 6.

At block 1315, the UE 115 may receive a MIB on the carrier as described with reference to FIGS. 2-3. In certain examples, the operations of block 1315 may be performed by the MIB module 510 as described with reference to FIG. 5.

At block 1320, the UE 115 may interpret at least one field of the MIB based at least in part on the duplexing configuration of the carrier as described with reference to FIGS. 2-3. In certain examples, the operations of block 1320 may be performed by the MIB interpretation module 515 as described with reference to FIG. 5.

At block 1325, the UE 115 may update the postulated special subframe configuration based at least in part on the received MIB as described with reference to FIGS. 2-3. In certain examples, the operations of block 1325 may be performed by the special subframe module 610 as described with reference to FIG. 6.

Figure 14:
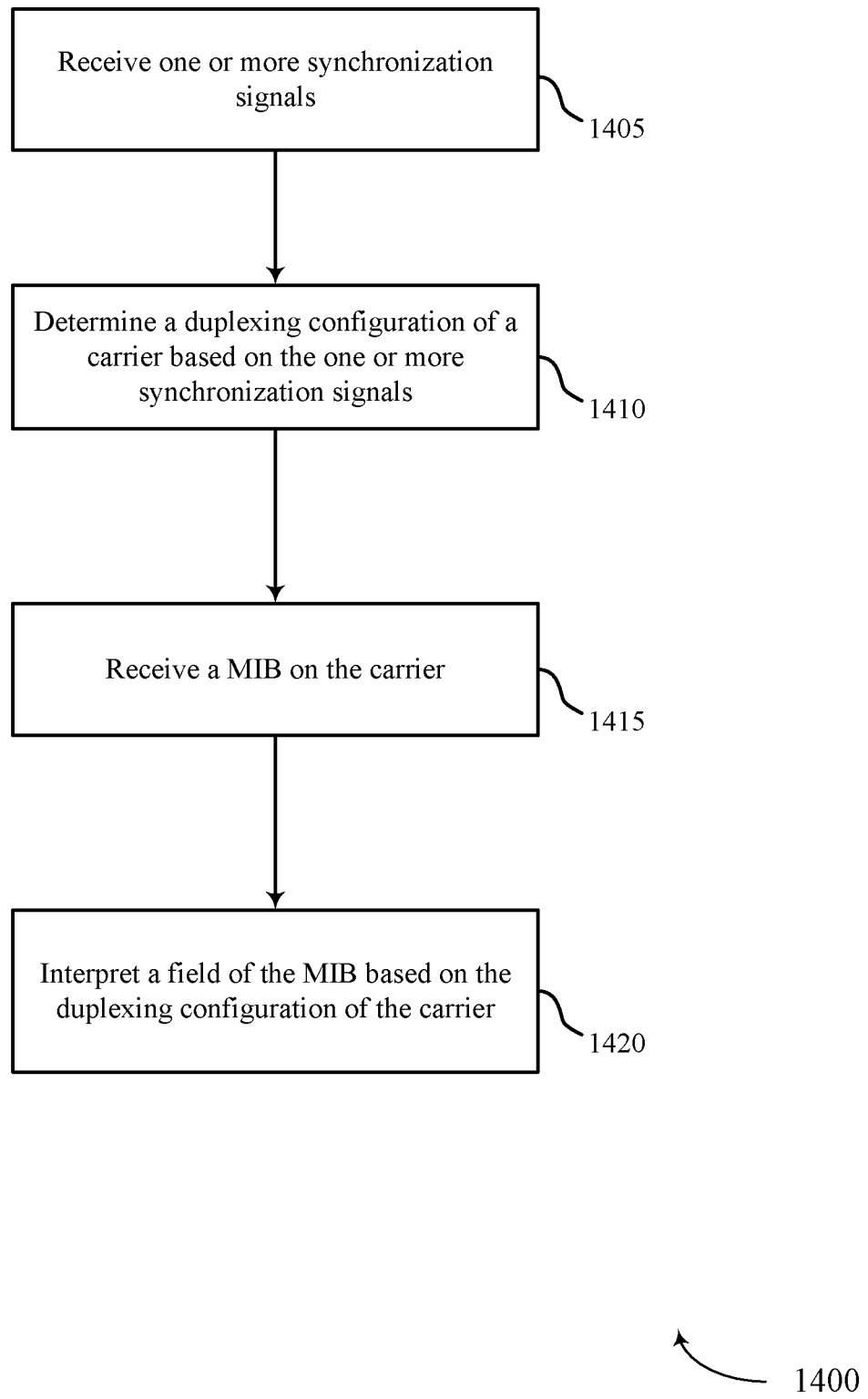

FIG. 14 shows a flowchart illustrating a method 1400 for system type dependent MIB in accordance with various aspects of the present disclosure. The operations of method 1400 may be implemented by a UE 115 or its components as described with reference to FIGS. 1-11. For example, the operations of method 1400 may be performed by the system type dependent MIB module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of methods 1200, and 1300 of FIGS. 12-13.

At block 1405, the UE 115 may receive one or more synchronization signals, such that a duplexing configuration is determined based at least in part on the one or more synchronization signals as described with reference to FIGS. 2-3. In certain examples, the operations of block 1405 may be performed by the synchronization module 620 as described with reference to FIG. 6.

At block 1410, the UE 115 may determine a duplexing configuration of a carrier as described with reference to FIGS. 2-3. In certain examples, the operations of block 1410 may be performed by the duplexing configuration module 505 as described with reference to FIG. 5.

At block 1415, the UE 115 may receive a MIB on the carrier as described with reference to FIGS. 2-3. In certain examples, the operations of block 1415 may be performed by the MIB module 510 as described with reference to FIG. 5.

At block 1420, the UE 115 may interpret at least one field of the MIB based at least in part on the duplexing configuration of the carrier as described with reference to FIGS. 2-3. In certain examples, the operations of block 1420 may be performed by the MIB interpretation module 515 as described with reference to FIG. 5.

Figure 15:
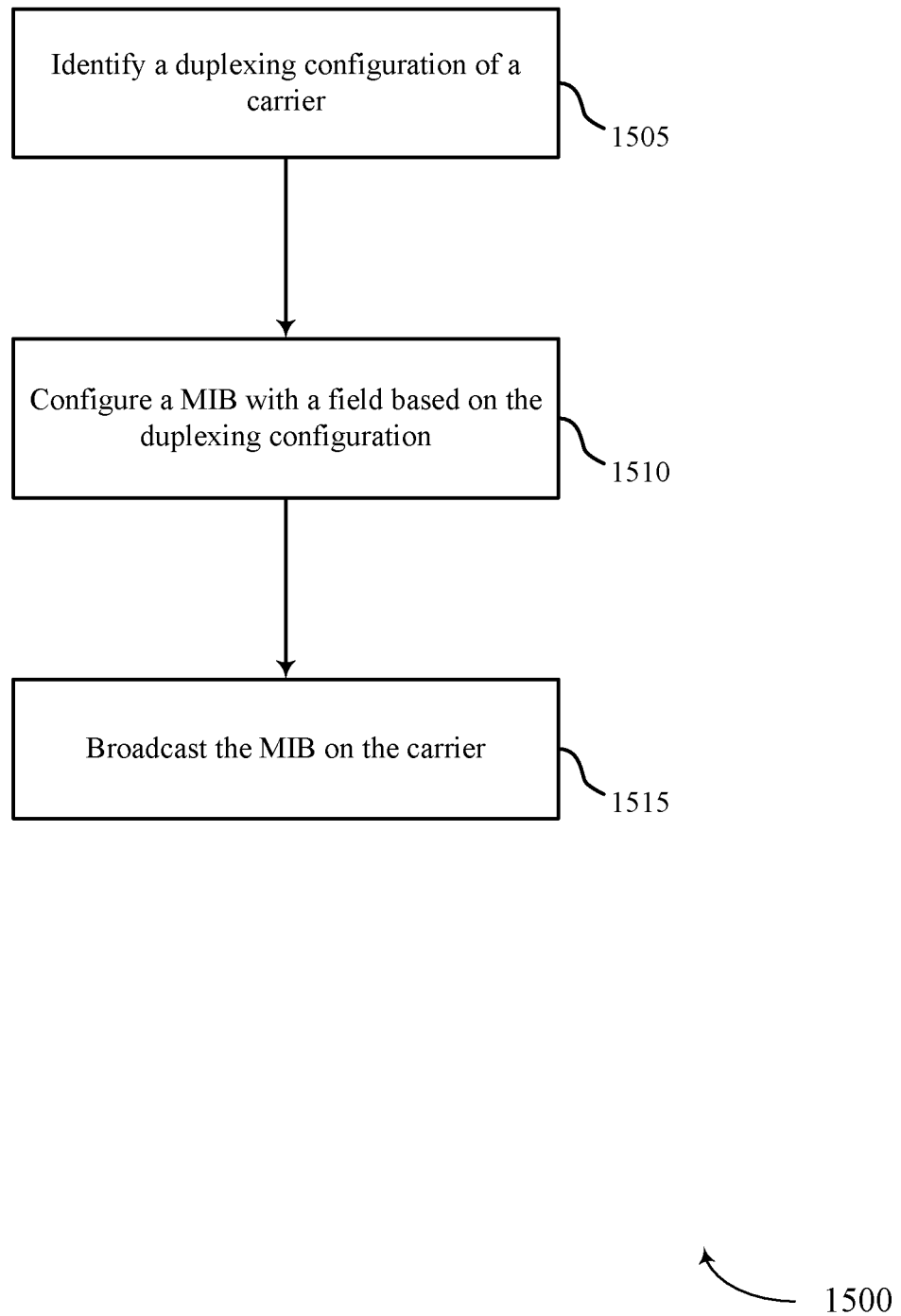

FIG. 15 shows a flowchart illustrating a method 1500 for system type dependent MIB in accordance with various aspects of the present disclosure. The operations of method 1500 may be implemented by a base station 105 or its components as described with reference to FIGS. 1-11. For example, the operations of method 1500 may be performed by the base station system type dependent MIB module 810 as described with reference to FIGS. 8-11. In some examples, a base station 105 may execute a set of codes to control the functional elements of the base station 105 to perform the functions described below. Additionally or alternatively, the base station 105 may perform aspects the functions described below using special-purpose hardware. The method 1500 may also incorporate aspects of methods 1200, 1300, and 1400 of FIGS. 12-14.

At block 1505, the base station 105 may identify a duplexing configuration of a carrier as described with reference to FIGS. 2-3. In certain examples, the operations of block 1505 may be performed by the BS duplexing configuration module 905 as described with reference to FIG. 9.

At block 1510, the base station 105 may configure a MIB with at least one field based at least in part on the duplexing configuration as described with reference to FIGS. 2-3. In certain examples, the operations of block 1510 may be performed by the MIB configuration module 910 as described with reference to FIG. 9.

At block 1515, the base station 105 may broadcast the MIB on the carrier as described with reference to FIGS. 2-3. In certain examples, the operations of block 1515 may be performed by the transmitter 815 as described with reference to FIG. 8.

Thus, methods 1200, 1300, 1400, and 1500 may provide for system type dependent MIB. It should be noted that methods 1200, 1300, 1400, and 1500 describe possible implementation, and that the operations and the steps may be rearranged or otherwise modified such that other implementations are possible. In some examples, aspects from two or more of the methods 1200, 1300, 1400, and 1500 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and subsystem 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   determining, at a user equipment (UE), a duplexing configuration of a carrier, wherein the duplexing configuration comprises one of a time division duplex (TDD) configuration or a frequency division duplex (FDD) configuration;
   in response to a determination that the duplexing configuration is the TDD configuration, postulating a special subframe configuration based at least in part on the TDD configuration of the carrier;
   receiving, at the UE, a master information block (MIB) on the carrier subsequent to the determining, wherein the MIB is received according to the postulated special subframe configuration in response to the determination that the duplexing configuration is the TDD configuration, wherein the MIB comprises at least one field indicative of a parameter of a system information block (SIB), wherein the at least one field is common to both TDD and FDD configurations and is indicative of a parameter of the SIB, and wherein a value of the at least one field is interpreted differently if the duplexing configuration comprises the TDD configuration than if the duplexing configuration comprises the FDD configuration;
   determining, at the UE and based at least in part on the duplexing configuration of the carrier, the parameter of the SIB from the at least one field; and
   receiving the SIB based on the parameter of the SIB.

2. The method of claim 1, wherein the MIB comprises a field to indicate a special subframe configuration.

3. The method of claim 1, wherein the at least one field of the MIB comprises one of an indication of a SIB location or an indication of a number of repetitions of the SIB.

4. The method of claim 1, wherein the postulated special subframe configuration comprises an eleven-symbol downlink pilot time slot (DwPTS), a nine-symbol DwPTS, a one-symbol guard period, a two-symbol uplink pilot time slot (UpPTS), or any combination thereof.

5. The method of claim 1, further comprising:
   receiving one or more synchronization signals, wherein the duplexing configuration is determined based at least in part on the one or more synchronization signals.

6. The method of claim 1, wherein the at least one field of the MIB comprises a duplex configuration-specific field.

7. The method of claim 2, wherein the special subframe configuration comprises a reduced downlink pilot time slots (DwPTS) set.

8. The method of claim 2, further comprising:
   updating the postulated special subframe configuration based at least in part on the special subframe configuration indicated in the received MIB.

9. The method of claim 3, wherein the SIB location is indicative of one or more downlink (DL) subframe options for the SIB.

10. A user equipment (UE) for wireless communication, comprising:
    means by one or more processors for determining, at the UE, a duplexing configuration of a carrier, wherein the duplexing configuration comprises one of a time division duplex (TDD) configuration or a frequency division duplex (FDD) configuration;
    means for, in response to a determination that the duplexing configuration is the TDD configuration, postulating a special subframe configuration based at least in part on the TDD configuration of the carrier;
    means for receiving, at the UE, a master information block (MIB) on the carrier subsequent to the determining, wherein the MIB is received according to the postulated special subframe configuration in response to the determination that the duplexing configuration is the TDD configuration, wherein the MIB includes at least one field indicative of a parameter of a system information block (SIB), wherein the at least one field is common to both TDD and FDD configurations and is indicative of a parameter of the SIB, and wherein a value of the at least one field is interpreted differently if the duplexing configuration comprises the TDD configuration than if the duplexing configuration comprises the FDD configuration;
    means by one or more processors for determining, at the UE and based at least in part on the duplexing configuration of the carrier, the parameter of the SIB from the at least one field; and
    means for receiving the SIB based on the parameter of the SIB.

11. The UE of claim 10, wherein the MIB comprises a field to indicate a special subframe configuration.

12. The UE of claim 10, wherein the at least one field of the MIB comprises one of an indication of a SIB location or an indication of a number of repetitions of the SIB.

13. The UE of claim 10, wherein the postulated special subframe configuration comprises an eleven-symbol downlink pilot time slot (DwPTS), a nine-symbol DwPTS, a one-symbol guard period, a two-symbol uplink pilot time slot (UpPTS), or any combination thereof.

14. The UE of claim 10, further comprising:
means for receiving one or more synchronization signals, wherein the duplexing configuration is determined based at least in part on the one or more synchronization signals.

15. The UE of claim 10, wherein the at least one field of the MIB comprises a duplex configuration-specific field.

16. The UE of claim 11, wherein the special subframe configuration comprises a reduced downlink pilot time slots (DwPTS) set.

17. The UE of claim 11, further comprising:
means by one or more processors for updating the postulated special subframe configuration based at least in part on the special subframe configuration indicated in the received MIB.

18. The UE of claim 12, wherein the SIB location is indicative of one or more downlink (DL) subframe options for SIB.

19. A user equipment (UE) for wireless communication, comprising:
a processor;
memory in electronic communication with the processor; and
instructions stored in the memory and operable, when executed by the processor, to cause the UE to:
determine, at the UE, a duplexing configuration of a carrier, wherein the duplexing configuration comprises one of a time division duplex (TDD) configuration or a frequency division duplex (FDD) configuration;
in response to a determination that the duplexing configuration is the TDD configuration, postulate a special subframe configuration based at least in part on the TDD configuration of the carrier;
receive, at the UE, a master information block (MIB) on the carrier subsequent to the determining, wherein the MIB is received according to the postulated special subframe configuration in response to the determination that the duplexing configuration is the TDD configuration, wherein the MIB includes at least one field indicative of a parameter of a system information block (SIB), wherein the at least one field is common to both TDD and FDD configurations and is indicative of a parameter of the SIB, and wherein a value of the at least one field is interpreted differently if the duplexing configuration comprises the TDD configuration than if the duplexing configuration comprises the FDD configuration;
determine, at the UE and based at least in part on the duplexing configuration of the carrier, the parameter of the SIB from the at least one field; and
receive the SIB based on the parameter of the SIB.

20. The UE of claim 19, wherein the MIB comprises a field to indicate a special subframe configuration.

21. The UE of claim 19, wherein the at least one field of the MIB comprises one of an indication of a SIB location or indication of a number of repetitions of the SIB.

22. The UE of claim 19, wherein the postulated special subframe configuration comprises an eleven-symbol downlink pilot time slot (DwPTS), a nine-symbol DwPTS, a one-symbol guard period, a two-symbol uplink pilot time slot (UpPTS), or any combination thereof.

23. The UE of claim 19, wherein the instructions are operable to cause to:
receive one or more synchronization signals, wherein the duplexing configuration is determined based at least in part on the one or more synchronization signals.

24. The UE of claim 19, wherein the at least one field of the MIB comprises a duplex configuration-specific field.

25. The UE of claim 20, wherein the special subframe configuration comprises a reduced downlink pilot time slots (DwPTS) set.

26. The UE of claim 20, wherein the instructions are operable to cause to:
update the postulated special subframe configuration based at least in part on the special subframe configuration indicated in the received MIB.

27. The UE of claim 21, wherein the SIB location is indicative of one or more downlink (DL) subframe options for SIB.

28. A non-transitory computer-readable medium storing code for wireless communication, the code comprising instructions executable to:
determine, at a user equipment (UE), a duplexing configuration of a carrier, wherein the duplexing configuration comprises one of a time division duplex (TDD) configuration or a frequency division duplex (FDD) configuration;
in response to a determination that the duplexing configuration is the TDD configuration, postulate a special subframe configuration based at least in part on the TDD configuration of the carrier;
receive, at the UE, a master information block (MIB) on the carrier subsequent to the determining, wherein the MIB is received according to the postulated special subframe configuration in response to the determination that the duplexing configuration is the TDD configuration, wherein the MIB includes at least one field indicative of a parameter of a system information block (SIB), wherein the at least one field is common to both TDD and FDD configurations and is indicative of a parameter of the SIB, and wherein a value of the at least one field is interpreted differently if the duplexing configuration comprises the TDD configuration than if the duplexing configuration comprises the FDD configuration;
determine, at the UE and based at least in part on the duplexing configuration of the carrier, the parameter of the SIB from the at least one field; and
receive the SIB based on the parameter of the SIB.

29. The non-transitory computer-readable medium of claim 28, wherein the MIB comprises a field to indicate a special subframe configuration.

30. The non-transitory computer-readable medium of claim 28, wherein the at least one field of the MIB comprises one of an indication of a SIB location or an indication of a number of repetitions of the SIB.

31. The non-transitory computer-readable medium of claim 28, wherein the postulated special subframe configuration comprises an eleven-symbol downlink pilot time slot (DwPTS), a nine-symbol DwPTS, a one-symbol guard period, a two-symbol uplink pilot time slot (UpPTS), or any combination thereof.

32. The non-transitory computer-readable medium of claim 28, wherein the instructions are executable to:

receive one or more synchronization signals, wherein the duplexing configuration is determined based at least in part on the one or more synchronization signals.

33. The non-transitory computer-readable medium of claim 28, wherein the at least one field of the MIB comprises a duplex configuration-specific field.

34. The non-transitory computer-readable medium of claim 29, wherein the special subframe configuration comprises a reduced downlink pilot time slots (DwPTS) set.

35. The non-transitory computer-readable medium of claim 29, wherein the instructions are executable to:
update the postulated special subframe configuration based at least in part on the special subframe configuration indicated in the received MIB.

36. The non-transitory computer-readable medium of claim 30, wherein the SIB location is indicative of one or more downlink (DL) subframe options for SIB.

\* \* \* \* \*